(12) United States Patent
Kadono et al.

(10) Patent No.: US 9,538,196 B2
(45) Date of Patent: ***Jan. 3, 2017

(54) MOTION VECTOR DERIVATION METHOD, MOVING PICTURE CODING METHOD AND MOVING PICTURE DECODING METHOD

(71) Applicant: Panasonic Intellectual Property Corporation of America, Torrance, CA (US)

(72) Inventors: Shinya Kadono, Fukuoka (JP); Satoshi Kondo, Kyoto (JP); Makoto Hagai, Osaka (JP); Kiyofumi Abe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,105

(22) Filed: Jan. 7, 2016

(65) Prior Publication Data

US 2016/0119640 A1 Apr. 28, 2016

Related U.S. Application Data

(60) Continuation of application No. 14/584,500, filed on Dec. 29, 2014, now Pat. No. 9,277,236, which is a
(Continued)

(30) Foreign Application Priority Data

Jul. 2, 2002 (JP) .................................. 2002-193028

(51) Int. Cl.
*H04N 19/52* (2014.01)
*G06F 1/03* (2006.01)
(Continued)

(52) U.S. Cl.
CPC .................. *H04N 19/52* (2014.11); *G06F 1/03* (2013.01); *H04N 19/43* (2014.11); *H04N 19/503* (2014.11);
(Continued)

(58) Field of Classification Search
CPC ...... H04N 19/52; H04N 19/503; H04N 19/51; H04N 19/61; H04N 19/43; H04N 19/577; H04N 19/513; H04N 19/587; H04N 19/625
(Continued)

(56) References Cited

U.S. PATENT DOCUMENTS 5,650,829 A 7/1997 Sugimoto
5,657,086 A * 8/1997 Tahara et al. ........ H04N 19/105
375/240.13
(Continued)

FOREIGN PATENT DOCUMENTS

JP 10-136372 5/1998
JP 2001-86508 3/2001
(Continued)

OTHER PUBLICATIONS

Supplementary European Search Report issued Mar. 10, 2008 in European Application No. 03 72 8003.
(Continued)

*Primary Examiner* — Tung Vo
(74) *Attorney, Agent, or Firm* — Wenderoth, Lind & Ponack, L.L.P.

(57) ABSTRACT

A motion vector derivation unit includes a comparison unit for comparing a parameter TR1 for a reference vector with a predetermined value to determine whether it exceeds the predetermined value or not; a switching unit for switching selection between the maximum value of a pre-stored parameter TR and the parameter TR1 according to the
(Continued)

comparison result by the comparison unit; a multiplier parameter table (for multipliers); and a multiplier parameter table (for divisors) for associating the parameter TR1 with a value approximate to the inverse value (1/TR1) of this parameter TR1.

2 Claims, 18 Drawing Sheets

Related U.S. Application Data continuation of application No. 13/372,885, filed on Feb. 14, 2012, now Pat. No. 8,948,265, which is a division of application No. 12/430,321, filed on Apr. 27, 2009, now Pat. No. 8,139,644, which is a division of application No. 11/980,600, filed on Oct. 31, 2007, now abandoned, which is a continuation of application No. 10/475,655, filed as application No. PCT/JP03/05418 on Apr. 28, 2003, now Pat. No. 7,327,788.

(51) Int. Cl.
| | |
|---|---|
| *H04N 21/2743* | (2011.01) |
| *H04N 19/503* | (2014.01) |
| *H04N 19/51* | (2014.01) |
| *H04N 19/61* | (2014.01) |
| *H04N 19/43* | (2014.01) |
| *H04N 19/577* | (2014.01) |
| *H04N 19/513* | (2014.01) |
| *H04N 19/587* | (2014.01) |
| *H04N 19/625* | (2014.01) |

(52) U.S. Cl.
CPC ............ *H04N 19/51* (2014.11); *H04N 19/513* (2014.11); *H04N 19/577* (2014.11); *H04N 19/587* (2014.11); *H04N 19/61* (2014.11); *H04N 19/625* (2014.11); *H04N 21/2743* (2013.01); *G06F 2101/12* (2013.01)

(58) Field of Classification Search
USPC .................................................... 375/240.16
See application file for complete search history.

(56) References Cited

U.S. PATENT DOCUMENTS

| | | |
|---|---|---|
| 5,701,164 A | 12/1997 | Kato |
| 5,886,742 A | 3/1999 | Hibi |
| 5,946,042 A | 8/1999 | Kato |
| 5,963,673 A | 10/1999 | Kodama et al. |
| 6,025,880 A * | 2/2000 | Nakagawa et al. .... H04N 19/51 375/240.16 |
| 6,035,322 A | 3/2000 | Demura |
| 6,040,863 A | 3/2000 | Kato |
| 6,078,618 A | 6/2000 | Yokoyama |
| 6,141,381 A | 10/2000 | Sugiyama |
| 6,201,896 B1 | 3/2001 | Ishikawa |
| 6,373,893 B1 | 4/2002 | Midorikawa |
| 6,418,168 B1 | 7/2002 | Narita |
| 6,625,214 B1 * | 9/2003 | Umehara et al. ... G06K 9/00765 348/595 |
| 6,757,330 B1 | 6/2004 | Hsu |
| 6,876,703 B2 | 4/2005 | Ismaeil et al. |
| 7,327,788 B2 | 2/2008 | Kadono |
| 8,139,644 B2 | 3/2012 | Kadono |
| 8,879,619 B2 | 11/2014 | Segall |
| 8,948,265 B2 | 2/2015 | Kadono |
| 9,083,974 B2 | 7/2015 | Jeon |
| 2003/0016755 A1* | 1/2003 | Tahara et al. .......... H04N 19/10 375/240.25 |
| 2004/0151341 A1* | 8/2004 | Fujikawa et al. ..... G06T 1/0028 382/100 |

FOREIGN PATENT DOCUMENTS

| | | |
|---|---|---|
| WO | 90/12361 A1 | 10/1990 |
| WO | 98/10593 | 3/1998 |

OTHER PUBLICATIONS

"Text of Committee Draft of Joint Video Specification (ITU-T Rec. H-264 ISO/IEC 14496-10 AVC) MPEG02/N4810", ISO/IEC JTC1/SC29/WG11 MPEG02/N4810, Fairfax, US, May 2002, pp. 105-106, XP002470623.

T. Granlund et al., "Division by Invariant Integers Using Multiplication", ACM Sigplan Notices, ACM, Association for Computing Machinery, New York, NY, US, vol. 29, No. 6, Jun. 1, 1994, pp. 61-72, XP000450406.

* cited by examiner

Fig. 5

| Divisor (TR1) | Inverse (1/TR1) | Multiplier parameter (Tscl) |
|---|---|---|
| 1 | 1/1 | 1 |
| 2 | 1/2 | 0.5 |
| 3 | 1/3 | 0.333 |
| 4 | 1/4 | 0.25 |
| 5 | 1/5 | 0.2 |
| 6 | 1/6 | 0.167 |
| 7 | 1/7 | 0.143 |
| 8 | 1/8 | 0.125 |

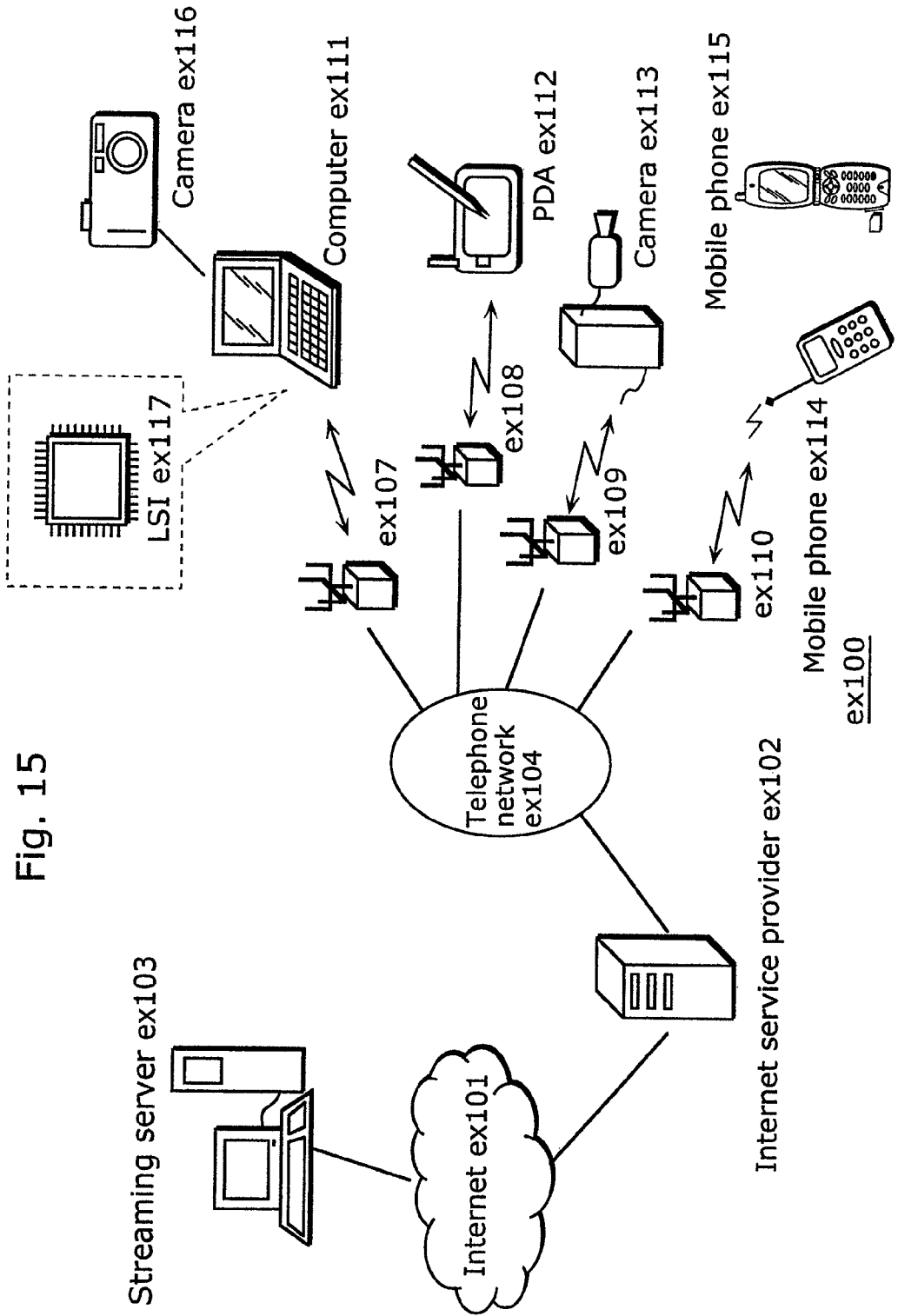

MOTION VECTOR DERIVATION METHOD, MOVING PICTURE CODING METHOD AND MOVING PICTURE DECODING METHOD

CROSS REFERENCES TO RELATED APPLICATIONS

This application is a continuation of application Ser. No. 14/584,500, filed Dec. 29, 2014, which is a continuation of application Ser. No. 13/372,885, filed Feb. 14, 2012, now U.S. Pat. No. 8,948,265, which is a divisional of application Ser. No. 12/430,321, filed Apr. 27, 2009, now U.S. Pat. No. 8,139,644, which is a divisional of application Ser. No. 11/980,600, filed Oct. 31, 2007, now abandoned, which is a continuation of application Ser. No. 10/475,655, now U.S. Pat. No. 7,327,788, which is the National Stage of International Application No. PCT/JP03/05418, filed Apr. 28, 2003.

TECHNICAL FIELD

The present invention relates to a motion vector derivation method for deriving a motion vector indicating motion of each block between pictures, a moving picture coding method for coding a moving picture by inter picture prediction coding involving motion compensation using the derived motion vector, and a moving picture decoding method.

BACKGROUND ART

With the development of multimedia applications, it has become common in recent years to handle information of all sorts of media such as audio, video and text in an integrated manner. In doing so, it becomes possible to handle media integrally by digitalizing all the media. However, since digitalized images have an enormous amount of data, information compression techniques are of absolute necessity for their storage and transmission. On the other hand, in order to interoperate compressed image data, standardization of compression techniques is also important. Standards on image compression techniques include H. 261 and H. 263 recommended by ITU-T (International Telecommunication Union Telecommunication Standardization Sector), and MPEG (Moving Picture Experts Group)-1, MPEG-2 and MPEG-4 of ISO (International Organization for Standardization).

Inter picture prediction involving motion compensation is a technique common to these moving picture coding methods. For motion compensation in these moving picture coding methods, each of pictures constituting an inputted moving picture is divided into rectangles (blocks) of a predetermined size, and a predictive image which is to be referred to for coding and decoding is generated based on a motion vector indicating motion of each block between pictures.

A motion vector is estimated for each block or each area that is a division of a block. A previously coded picture which is located forward or backward in display order of a current picture to be coded is to be a reference picture (hereinafter referred to as a forward reference picture or a backward reference picture). In motion estimation, a block (an area) in a reference picture for predicting a current block to be coded most appropriately is selected from the blocks in the reference picture, and the relative location of the selected block to the current block is to be the best motion vector. At the same time, a prediction mode, that is, the information specifying a prediction method for making the most appropriate prediction using pictures which can be referred to, is determined.

One of such prediction modes is direct mode, for example, in which inter picture prediction coding is performed with reference to temporally forward and backward pictures in display order (See, for example, ISO/IEC MPEG and ITU-T VCEG Working Draft Number 2, Revision 2 2002-03-15 P.64 7.4.2 Motion vectors in direct mode). In direct mode, a motion vector is not coded explicitly as data to be coded, but derived from a previously coded motion vector. To be more specific, a motion vector of a current block in a current picture to be coded is calculated with reference to a motion vector of a block (reference block) which is located at the same coordinate (spatial position) in a previously coded picture in the neighborhood of the current picture as that of the current block in the current picture. Then, a predictive image (motion compensation data) is generated based on this calculated motion vector. Note that when decoding, a motion vector is derived in direct mode based on a previously decoded motion vector in the same manner.

Calculation of a motion vector in direct mode will be explained below more specifically. FIG. 1 is an illustration of motion vectors in direct mode. In FIG. 1, a picture 1200, a picture 1201, a picture 1202 and a picture 1203 are located in display order. The picture 1202 is a current picture to be coded, and a block MB1 is a current block to be coded. FIG. 1 shows the case where multiple inter picture prediction is performed for the block MB1 in the picture 1202 using the pictures 1200 and 1203 as reference pictures. In order to simplify the following explanation, it is assumed that the picture 1203 is located backward of the picture 1202 and the picture 1200 is located forward of the picture 1202, but these pictures 1200 and 1203 do not always need to be located in this order.

The picture 1203 that is a backward reference picture for the picture 1202 has a motion vector which refers to the forward picture 1200. So, motion vectors of the current block MB1 are determined using a motion vector MV1 of a reference block MB2 in the picture 1202 located backward of the current picture 1202.

Two motion vectors MVf and MVb are calculated by $$MVf = MV1 \times TRf/TR1 \qquad \text{Equation 1(a)}$$

$$MVb = MV1 \times TRb/TR1 \qquad \text{Equation 1(b)}$$

where MVf is the forward motion vector of the current block MB1, MVb is the backward motion vector of the current block MB1, TR1 is the difference in time information between the picture 1200 and the picture 1203 (difference in time information between the picture having the motion vector MV1 and the reference picture pointed by MV1), TRf is the difference in time information between the picture 1200 and the picture 1202 (difference in time information between the picture having the motion vector MVf and the reference picture pointed by MVf), and TRb is the difference in time information between the picture 1202 and the picture 1203 (difference in time information between the picture having the motion vector MVb and the reference picture pointed by MVb). Note that TR1, TRf and TRb are not limited to a difference in time information between pictures, but may be index data (data included in a stream explicitly or implicitly or data associated with a stream) indicating a temporal distance between pictures in display order so as to be used for scaling motion vectors, such as data obtained using a difference in picture numbers assigned to respective pictures, data obtained using a difference in picture display order (or information indicating picture display order) and data obtained using the number of pictures between pictures.

Next, a flow of processing for deriving motion vectors will be explained. FIG. 2 is a flowchart showing a flow of processing for deriving motion vectors. First, information on the motion vector of the reference block MB2 is obtained (Step S1301). In the example as shown in FIG. 1, information on the motion vector MV1 is obtained. Next, parameters for deriving motion vectors of the current block MB1 are obtained (Step S1302). The parameters for deriving the motion vectors of the current block MB1 are scaling coefficient data used for scaling the motion vector obtained in Step S1301. More specifically, the parameters correspond to TR1, TRf and TRb in Equation 1(a) and Equation 1(b). Next, the motion vector obtained in Step S1301 is scaled by multiplication and division in Equation 1(a) and Equation 1(b) using these parameters so as to derive the motion vectors MVf and MVb of the current block MB1 (Step S1303).

As shown in abovementioned Equation 1(a) and Equation 1(b), division is required for deriving motion vectors. However, as the first problem, division takes more time for calculation than calculation such as addition and multiplication. It is not preferable for a device such as a mobile phone requiring lower power consumption because a calculator with lower capability is used in such a device to meet a requirement for lower power consumption.

Under these circumstances, it is conceived to derive motion vectors by multiplication with reference to multiplier parameters corresponding to divisors in order to avoid division. This allows calculation by multiplication with a smaller amount of calculation instead of division, and thus processing for scaling can be simplified.

However, as the second problem, since various values are applied to parameters for deriving motion vectors depending on distances between reference pictures and a picture including a current block, the parameters can have a wide range of values. An enormous number of parameters must be prepared for multiplier parameters corresponding to all the divisors, and thus large memory capacity is required.

So, in order to solve these first and second problems, the object of the present invention is to provide a motion vector derivation method, a moving picture coding method and a moving picture decoding method for deriving motion vectors with a smaller amount of calculation.

DISCLOSURE OF INVENTION

In order to achieve above object, the motion vector derivation method according to the present invention is a motion vector derivation method for deriving a motion vector of a block in a picture, comprising: a reference motion vector obtaining step of obtaining a reference motion vector for deriving a motion vector of a current block; a first parameter obtaining step of obtaining a first parameter corresponding to a distance between a picture which has the reference motion vector and a picture which is referred to by the reference motion vector; a second parameter obtaining step of obtaining at least a single second parameter corresponding to a distance between a picture which includes the current block and a picture which is referred to by the current block; a judgment step of judging whether the first parameter is a value within a predetermined range or not; and a motion vector derivation step of deriving the motion vector of the current block (1) by scaling the reference motion vector based on a predetermined value and the second parameter when the first parameter is not the value within the predetermined range as a result of the judgment in the judgment step, and (2) by scaling the reference motion vector based on the first parameter and the second parameter when the first parameter is the value within the predetermined range as a result of said judgment.

Also, the motion vector derivation method according to the present invention is a motion vector derivation method for deriving a motion vector of a block in a picture, comprising: a reference motion vector obtaining step of obtaining a reference motion vector for deriving a motion vector of a current block; a first parameter obtaining step of obtaining a first parameter corresponding to a distance between a picture which has the reference motion vector and a picture which is referred to by the reference motion vector; a second parameter obtaining step of obtaining at least a single second parameter corresponding to a distance between a picture which includes the current block and a picture which is referred to by the current block; a judgment step of judging whether the first parameter is a first predetermined value or larger; and a motion vector derivation step of deriving the motion vector of the current block (1) by scaling the reference motion vector based on the first predetermined value and the second parameter when the first parameter is the first predetermined value or larger as a result of the judgment in the judgment step, and (2) by scaling the reference motion vector based on the first parameter and the second parameter when the first parameter is smaller than the first predetermined value as a result of said judgment.

Here, in the judgment step, it is further judged whether the first parameter is a second predetermined value that is smaller than the first predetermined value or smaller, and in the motion vector derivation step, the motion vector of the current block may be derived by scaling the reference motion vector based on the second predetermined value and the second parameter when the first parameter is the second predetermined value or smaller as a result of the judgment in the judgment step.

Also, it is preferable that the above-mentioned motion vector derivation method further includes a conversion step of converting the obtained first parameter into an inverse value of said first parameter with reference to a multiplier parameter table indicating a relationship between the first parameter and the inverse value of the first parameter and obtaining the resulting inverse value as a third parameter.

Further, it is preferable that in the motion vector derivation step, the motion vector of the current block is derived by multiplying the reference motion vector, the second parameter and the third parameter, when scaling the reference motion vector based on the first parameter and the second parameter.

Accordingly, multiplication can be performed instead of division required for scaling a reference motion vector. Also, since a value of a parameter used for scaling a reference motion vector is limited to a predetermined range, data amount on a multiplier parameter table stored in a memory can be reduced. In addition, inconsistency in the results due to calculation error between coding and decoding can be prevented.

The motion vector derivation method according to the present invention is a motion vector derivation method for deriving a motion vector of a block in a picture, comprising: a reference motion vector obtaining step of obtaining a reference motion vector for deriving a motion vector of a current block; a first parameter obtaining step of obtaining a first parameter corresponding to a distance between a picture which has the reference motion vector and a picture which is referred to by the reference motion vector; a second parameter obtaining step of obtaining at least a single second parameter corresponding to a distance between a picture which includes the current block and a picture which is referred to by the current block; a judgment step of judging whether the first parameter is a first predetermined value or larger; and a motion vector derivation step of deriving the motion vector of the current block (1) by considering the reference motion vector as said motion vector of the current block when the first parameter is the first predetermined value or larger as a result of the judgment in the judgment step, and (2) by scaling the reference motion vector based on the first parameter and the second parameter when the first parameter is smaller than the first predetermined value as a result of said judgment.

Here, in the judgment step, it is further judged whether the first parameter is a second predetermined value that is smaller than the first predetermined value or smaller, and in the motion vector derivation step, the motion vector of the current block may be derived by considering the reference motion vector as said motion vector of the current block when the first parameter is the second predetermined value or smaller as a result of the judgment in the judgment step.

Accordingly, when a distance between a picture which is referred to by a reference motion vector and a picture which has the reference motion vector is out of a predetermined range of values, derivation of motion vectors can be simplified.

Further, the moving picture coding method according to the present invention is a moving picture coding method for coding a picture in a moving picture on a block by block basis, comprising: a motion compensation step of generating a motion compensation image of a current block to be coded using the motion vector derived by the motion vector derivation method according to the present invention; and a coding step of coding the current block to be coded using the motion compensation image.

Also, the moving picture decoding method according to the present invention is a moving picture decoding method for decoding coded moving picture data obtained by coding a picture in a moving picture on a block by block basis, comprising: a motion compensation step of generating a motion compensation image of a current block to be decoded using the motion vector derived by the motion vector derivation method according to the present invention; and a decoding step of decoding the current block to be decoded using the motion compensation image.

The present invention can be realized not only as the above-described motion vector derivation method, moving picture coding method and moving picture decoding method, but also as a motion vector derivation apparatus, a moving picture coding apparatus and a moving picture decoding apparatus including units for executing the characteristic steps included in these motion vector derivation method, moving picture coding method and moving picture decoding method, or as a program for causing a computer to execute these steps. It goes without saying that such a program can be distributed via a recording medium such as a CD-ROM or a transmission medium such as the Internet.

BRIEF DESCRIPTION OF DRAWINGS

FIG. 5 is a diagram showing a multiplier parameter table of the present invention.
FIG. 14A is an illustration showing a physical format of a flexible disk as a main unit of the recording medium,
FIG. 14B is an illustration showing a flexible disk, a cross-sectional view of the appearance of the flexible disk, and a front view of the appearance of the flexible disk,
and FIG. 14C is an illustration showing a configuration for writing and reading the program on and from the flexible disk.
FIG. 15 is a block diagram showing an overall configuration of a content providing system.

BEST MODE FOR CARRYING OUT THE INVENTION

The embodiments of the present invention will be explained below with reference to figures.

First Embodiment

Figure 3:
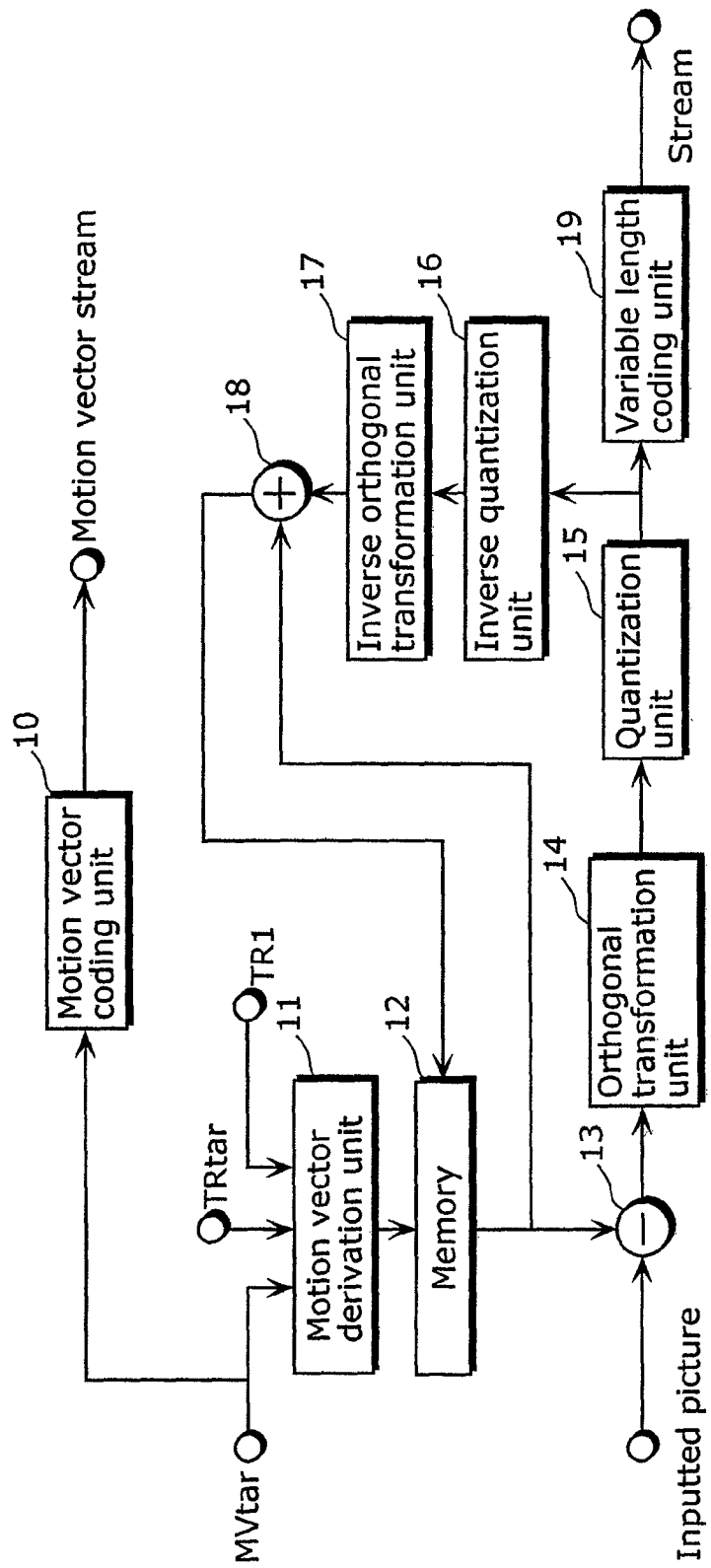
FIG. 3 is a block diagram showing a structure of a moving picture coding apparatus of the present invention.

FIG. 3 is a block diagram showing a structure of a moving picture coding apparatus according to the first embodiment. In FIG. 3, the terms which have already been explained in the background art with reference to FIG. 1 will be explained using the same signs as those in FIG. 1. The present embodiment is different from the conventional art in that parameters used for deriving motion vectors of the current picture to be coded 1202 are limited to a predetermined range of values.

As shown in FIG. 3, the moving picture coding apparatus includes a motion vector coding unit 10, a motion vector derivation unit 11, a memory 12, a subtracter 13, an orthogonal transformation unit 14, a quantization unit 15, an inverse quantization unit 16, an inverse orthogonal transformation unit 17, an adder 18 and a variable length coding unit 19.

The motion vector coding unit 10 encodes motion vectors (such as MV1) of respective pictures for output as a motion vector stream. The motion vector derivation unit 11 derives motion vectors MVscl (MVb and MVf) of a current block to be coded MB1 using a motion vector MVtar (MV1) of a reference block MB2, parameters TRtar and a parameter TR1. Here, the motion vector of the reference block MB2 is scaled based on the above-described Equation 1(a) and Equation 1(b). The parameters TRtar correspond to TRb and TRf as mentioned above.

The memory 12 stores the image data of the reference pictures and the motion vectors MVscl of the current picture 1202 derived by the motion vector derivation unit 11. In this memory 12, motion compensation data is generated based on the image data of the reference picture and the motion vectors MVscl of the current picture 1202. The subtracter 13 calculates a difference between image data of an inputted picture and the motion compensation data inputted from the memory 12 to obtain a differential value. The orthogonal transformation unit 14 performs DCT (discrete cosine transformation) for the differential value and outputs a DCT coefficient. The quantization unit 15 quantizes the DCT coefficient using a quantization step. The inverse quantization unit 16 inverse quantizes the quantized DCT coefficient using the quantization step back to the original DCT coefficient. The inverse orthogonal transformation unit 17 performs inverse orthogonal transformation for the DCT coefficient to output differential image data (differential value).

The adder 18 adds the differential image data (differential value) outputted from the inverse orthogonal transformation unit 17 and the image data of the reference picture stored in the memory 12 so as to obtain decoded image data corresponding to the inputted image data (original inputted image data) of the current picture 1202. This decoded image data is stored in the memory 12 as image data for reference when coding pictures which are to be coded later than the current picture 1202. The variable length coding unit 19 performs variable length coding for the DCT coefficient quantized by the quantization unit 15.

Next, the operation of the moving picture coding apparatus structured as mentioned above in direct mode coding will be explained with reference to FIG. 3.

Motion vectors of each picture are coded by the motion vector coding unit 10 and outputted as a motion vector stream.

The motion vector derivation unit 11 derives motion vectors of a current block MB1 as scaled versions of the motion vector MVtar of the reference block MB2 based on the parameters TRtar and TR1. The memory 12 extracts images of the pictures pointed by the motion vectors derived by the motion vector derivation unit 11 from among the image data of the reference pictures stored therein, and outputs them as motion compensation data.

The subtracter 13 calculates a difference between the image data of an inputted picture and the motion compensation data outputted from the memory 12 to obtain differential image data that is a differential value. The differential value is transformed into a DCT coefficient through orthogonal transformation by the orthogonal transformation unit 14. The DCT coefficient is quantized by the quantization unit 15, and inverse quantized by the inverse quantization unit 16 back to the original DCT coefficient. The DCT coefficient is reconstructed as differential image data (differential value) through inverse orthogonal transformation by the inverse orthogonal transformation unit 17. This differential image data (differential value) is added with the motion compensation data outputted from the memory 12 by the adder 18 to obtain decoded image data corresponding to the original inputted image data. This inputted image data is stored in the memory 12 as image data for reference when coding the following pictures to be coded.

The DCT coefficient quantized by the quantization unit 15 is performed of variable length coding by the variable length coding unit 19 and outputted as a stream.

Next, the structure for scaling motion vectors under the limit of parameters to a predetermined range of values will be explained with reference to FIG. 4.

Figure 4:
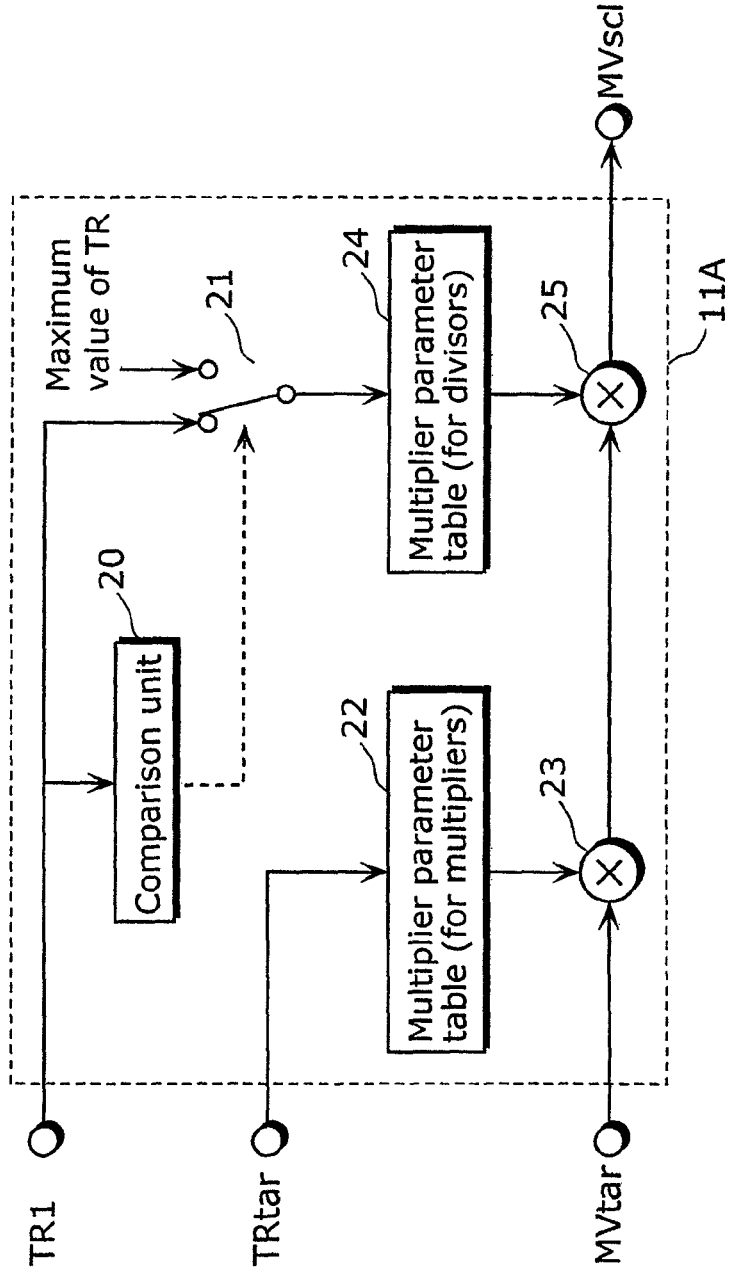
FIG. 4 is a block diagram showing a structure of a motion vector derivation unit of the present invention.

FIG. 4 is a block diagram showing the structure of the motion vector derivation unit 11 in FIG. 3.

As shown in FIG. 4, the motion vector derivation unit 11 includes a comparison unit 20, a switching unit 21, a multiplier parameter table (for multipliers) 22, multiplication units 23 and 25, and a multiplier parameter table (for divisors) 24.

The comparison unit 20 compares the parameter TR1 for the motion vector MVtar (MV1) of the reference block MB2 with a predetermined value to determine whether it exceeds the predetermined value or not. The switching unit 21 switches selection of the maximum value of a pre-stored parameter TR or the parameter TR1 based on the result of the comparison by the comparison unit 20. The multiplier parameter table 22 indicates the correspondence between the parameters TRtar (TRb and TRf) and the multipliers (multiplication values). The multiplication unit 23 multiplies the motion vector MVtar (MV1) of the reference block MB2 by multiplier parameters outputted from the multiplier parameter table 22.

The multiplier parameter table 24 indicates the correspondence between the output values from the switching unit 21 and the multiplication values. The multiplication unit 25 multiplies the output values from the multiplication unit 23 by the parameters outputted from the multiplier parameter table 24.

The operation of a motion vector derivation unit 11A will be explained below with reference to FIG. 4. The motion vector derivation unit 11A as shown in FIG. 4 corresponds to the motion vector derivation unit 11 in the block diagram of the moving picture coding apparatus as shown in FIG. 3.

The parameter TR1 for the motion vector MVtar (MV1) of the reference block MB2 is compared with a value predetermined by the comparison unit 20 to determine whether it exceeds the predetermined value or not. As a result, when the parameter TR1 does not exceed the predetermined value, the switching unit 21 selects the parameter TR1 as it is. On the other hand, when the parameter TR1 exceeds the predetermined value, the switching unit 21 selects the predetermined value (the maximum value of TR).

The multiplier parameters corresponding to the parameters TRtar (TRb and TRf) for the motion vectors MVscl (MVb and MVf) of the current block are selected on the multiplier parameter table 22, and the multiplication unit 23 multiplies the motion vector MVtar of the reference block MB2 by the selected multiplier parameters.

The multiplier parameters corresponding to the parameters selected by the switching unit 21 are selected on the multiplier parameter table 24, and the multiplication unit 25 multiplies the outputs of the multiplication unit 23 by the selected multiplier parameters.

The values (scaled values) obtained by multiplication of the motion vector MVtar of the reference block MB2 by the multiplier parameters respectively by the multiplication units 23 and 25 in this manner are the motion vectors MVscl of the current picture 1202.

FIG. 5 is a diagram showing an example of a multiplier parameter table, and this table corresponds to the multiplier parameter table 24 in FIG. 4.

The left column in FIG. 5 indicates parameters TR1 (divisors) inputted to this table, which are limited to a predetermined range of values "1"~"8". The center column indicates the multiplicative inverses (1/TR1) of the parameters. The right column indicates multiplier parameters (Tscl), which are values approximate to the inverse values (1/TR1) of the parameters indicated on the center column. In actual calculation, the multiplier parameters (Tscl) on the right column are used as values for deriving motion vectors MVscl of the current picture 1202, which allows simplification of calculation.

For example, two motion vectors MVf and MVb of a current block to be coded MB1 are calculated by $$MVf = MV1 \times TRf \times Tscl \quad \text{Equation 2(a)}$$

$$MVb = -MV1 \times TRb \times Tscl \quad \text{Equation 2(b)}$$

where MVf is a forward motion vector of the current block MB1, MVb is a backward motion vector of the current block MB1, Tscl is a multiplier parameter corresponding to an inverse value of a distance between the picture 1200 and the picture 1203, that is, 1/TR1, TRf is a distance between the picture 1200 and the picture 1202, and TRb is a distance between the picture 1202 and the picture 1203.

Next, processing for deriving motion vectors MVscl of a current block MB1 will be explained with reference to FIG. 6.

Figure 6:
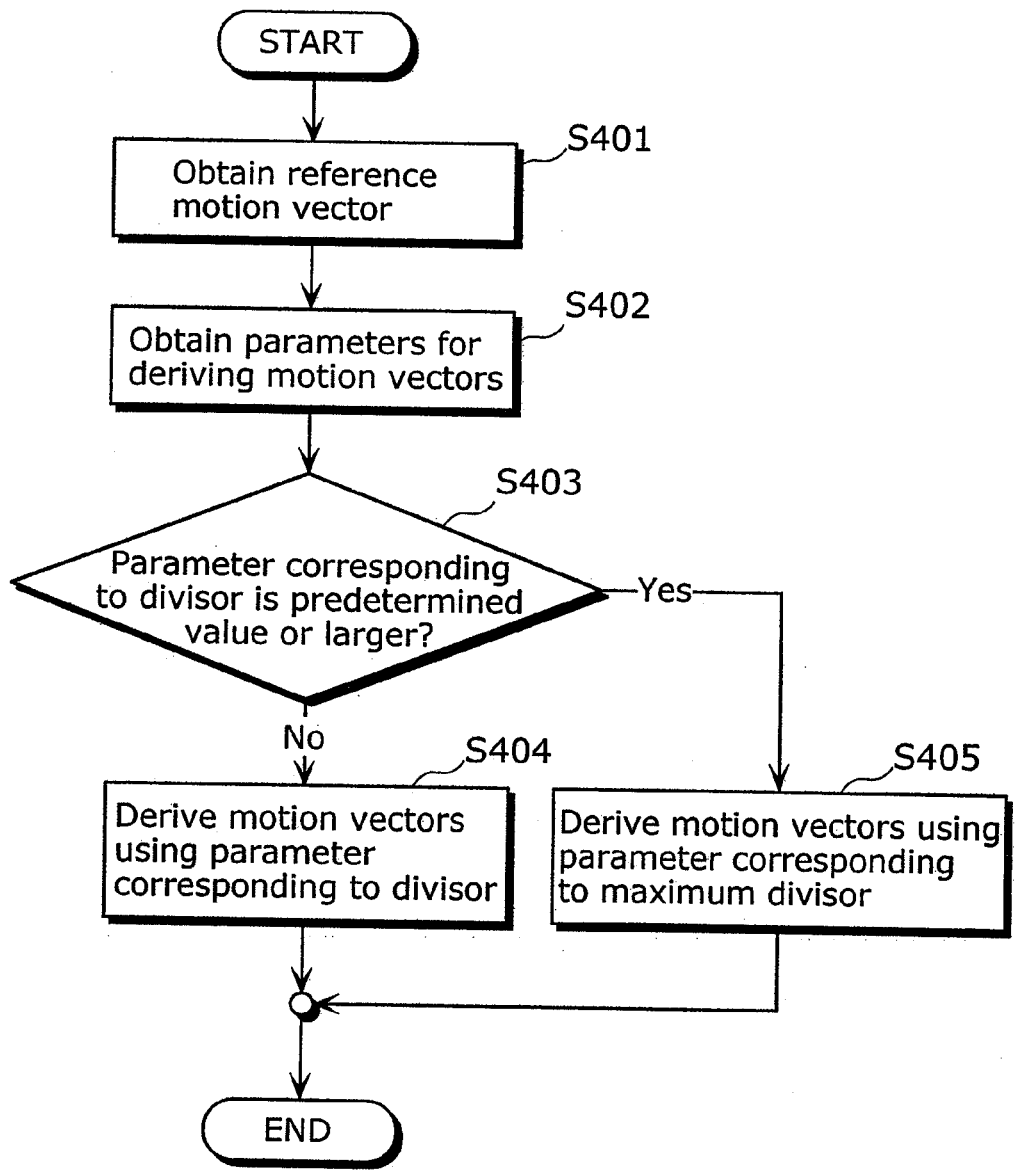
FIG. 6 is a flowchart showing a method for deriving motion vectors of the present invention.

FIG. 6 is a flowchart showing processing procedures for deriving motion vectors MVscl. The motion vector derivation unit 11A obtains information on a motion vector MVtar of a reference block MB2 (Step S401). This motion vector MVtar corresponds to MV1 in Equations 1(a) and 1(b). Next, the motion vector derivation unit 11A obtains parameters TRtar and a parameter TR1 for deriving the motion vectors MVscl of the current block MB1 (Step S402). These parameters TRtar correspond to TRf and TRb in Equations 1(a) and 1(b).

Next, the comparison unit 20 judges whether the parameter TR1 corresponding to a divisor is a predetermined value or larger (Step S403). When the parameter TR1 is a predetermined value or larger as a result of judgment, the switching unit 21 selects a parameter corresponding to the maximum divisor (the maximum value "8" of TR1 in the example of FIG. 5). Then, the motion vector derivation unit 11A scales the motion vector MVtar obtained in Step S401 using the parameter corresponding to the maximum divisor to derive the motion vectors MVscl of the current block MB1 (Step S405). On the other hand, when the obtained parameter TR1 is smaller than the predetermined value, the switching unit 21 selects a parameter corresponding to its divisor. Then, the motion vector derivation unit 11A scales the motion vector MVtar in the same manner using the parameter corresponding to the divisor to derive the motion vectors MVscl of the current block MB1 (Step S404).

As described above, according to the present embodiment, parameters used for scaling a motion vector of a reference block is limited to a predetermined range of values, and thus data amount of a multiplier parameter table corresponding to divisors stored in a memory can be reduced, and inconsistency in the results due to calculation error between coding and decoding can also be prevented, which are the effects of the present invention.

Figure 7:
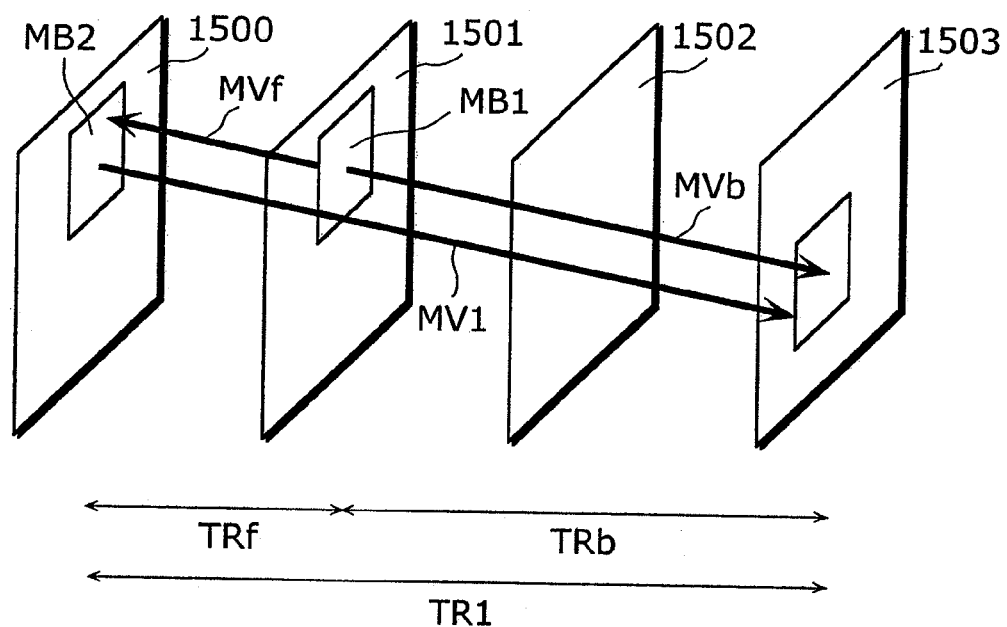
FIG. 7 is an illustration of motion vectors of the present invention.

In the present embodiment, it is judged in Step S403 whether the parameter TR1 is a predetermined value or larger, but the present invention is not limited to that, it may be judged whether the parameter TR1 is within a predetermined range of values or not. For example, as shown in FIG. 7, when a motion vector MV1 of a reference block MB2 refers to a backward picture, a parameter TR1 (divisor) and a multiplier parameter Tscl corresponding to the parameter TR1 are negative values as described below. In FIG. 7, a picture 1500, a picture 1501, a picture 1502 and a picture 1503 are located in display order. The picture 1501 is a current picture to be coded, and a block MB1 is a current block to be coded. FIG. 7 shows bi-prediction from the block MB1 in the picture 1501 with reference to the picture 1500 and the picture 1503.

When the picture 1500 which is a forward reference picture for the picture 1501 has a motion vector MV1 pointing to the picture 1503 which is a backward reference picture, motion vectors of the current block MB1 are determined using the motion vector MV1 of a reference block MB2 in the forward reference picture 1500 of the current picture 1501. Two motion vectors MVf and MVb are calculated using the above Equation 2(a) and Equation 2(b). In this case where the motion vector MV1 of the reference block MB2 refers to the backward picture, a parameter TR1 (divisor) and a multiplier parameter Tscl corresponding to the parameter TR1 are negative values.

Therefore, it is judged whether the parameter TR1 is a first predetermined value or larger and whether the parameter TR1 is a second predetermined value or smaller. When the parameter TR1 is the first predetermined value or larger as a result of this judgment, a motion vector MVtar is scaled using a parameter corresponding to the maximum divisor to derive motion vectors MVscl of the current block MB1. When the parameter TR1 is the second predetermined value or smaller, the motion vector MVtar is scaled using a parameter corresponding to the minimum divisor to derive the motion vectors MVscl of the current block MB1. Further, when the parameter TR1 is smaller than the first predetermined value and larger than the second predetermined value, the motion vector MVtar is scaled using the parameter TR1 to derive the motion vectors MVscl of the current block MB1.

As described in the background art, parameters TR1 and TRtar indicating the distances between pictures are not limited to a difference in time information between pictures, but may be index data indicating a temporal distance between pictures in display order so as to be used for scaling motion vectors, such as data obtained using a difference in picture numbers assigned to respective pictures, data obtained using a difference in picture display order (or information indicating picture display order) and data obtained using the number of pictures between pictures.

Since the number of multiplier parameters corresponding to divisors is infinite if the divisors are not limited to a predetermined range of values, a parameter table corresponding to divisors cannot be realized, and thus a mechanism for realizing division by multiplication cannot be realized in itself.

Note that, in the present embodiment, as an example of judging whether a parameter TR1 is within a predetermined range of values or not, "whether it is a predetermined value or larger" is judged as shown in FIG. 6, but "whether it exceeds a predetermined value or not" or "whether it is smaller than a predetermined value or not" may be judged.

Second Embodiment

In the above first embodiment, when a motion vector MVtar that is a reference motion vector is scaled to derive motion vectors MVscl, a parameter TR1 is compared with the upper limit of divisors stored in a multiplier parameter table, and if TR1 is the upper limit or larger, a value corresponding to the maximum divisor in the multiplier parameter table is used as a multiplier parameter corresponding to the inputted parameter TR1. In the second embodiment, the parameter TR1 is compared with the upper limit of divisors stored in the multiplier parameter table, and if TR1 is the upper limit or larger, the inputted MVtar is used as it is as the motion vectors MVscl without scaling the motion vector MVtar, and thus derivation of the motion vectors MVscl can be simplified when TR1 is the upper limit or larger. The second embodiment of the present invention will be explained below with reference to figures.

Figure 8:
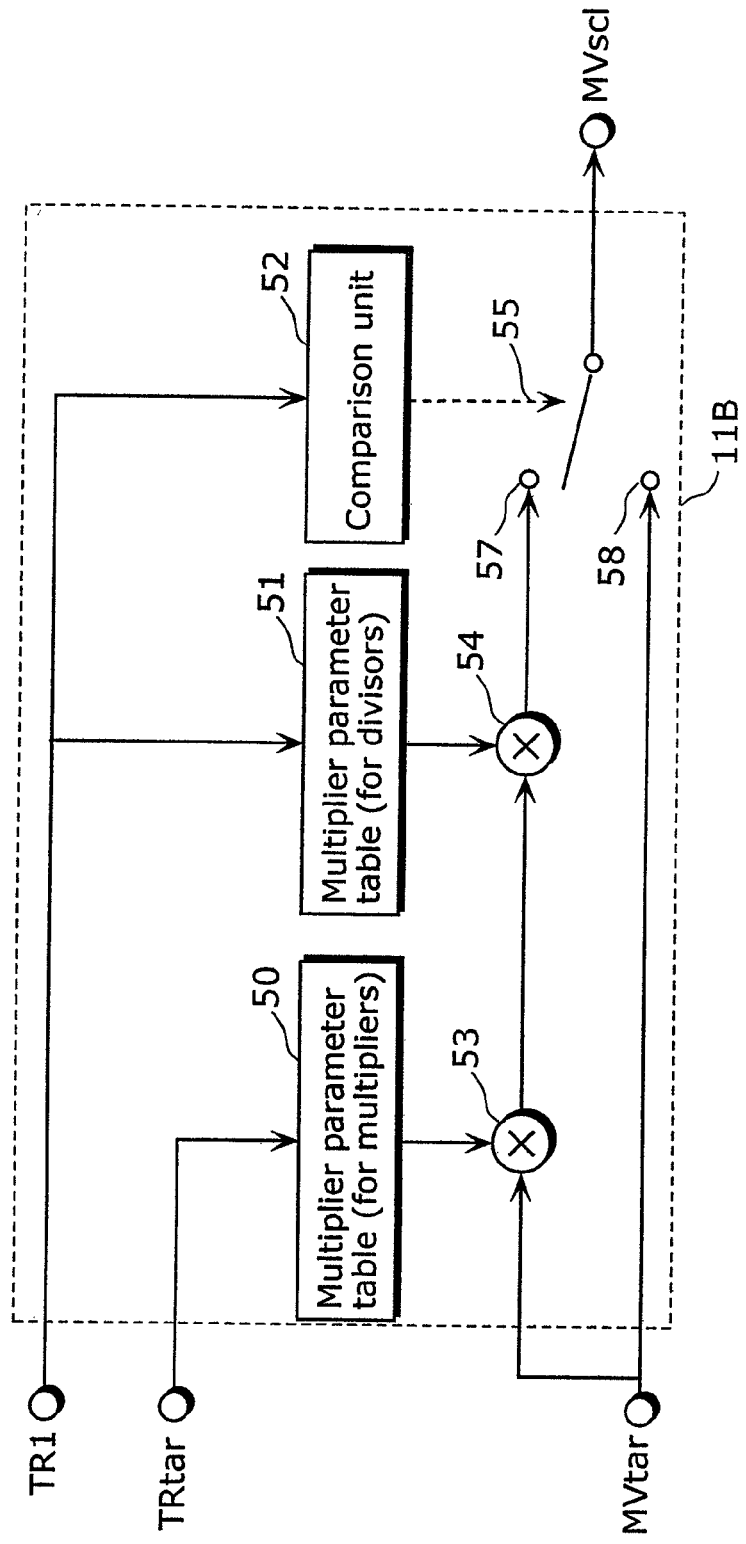
FIG. 8 is a block diagram showing a structure of another motion vector derivation unit of the present invention.

FIG. 8 is a block diagram showing a structure of a motion vector derivation unit of the second embodiment. A motion vector derivation unit 11B as shown in FIG. 8 corresponds to the motion vector derivation unit 11 in the block diagram of the moving picture coding apparatus in FIG. 3. Note that the structure of the moving picture coding apparatus as shown in the block diagram of FIG. 3, except the motion vector derivation unit 11, has been already explained in the first embodiment. Therefore, the motion vector derivation unit 11B as shown in FIG. 8 will be explained below with reference to FIG. 1 and FIG. 5.

As shown in FIG. 8, the motion vector derivation unit 11B includes a multiplier parameter table (for multipliers) 50, a multiplier parameter table (for divisors) 51, a comparison unit 52, a multiplication units 53 and 54, and a switching unit 55.

Figure 1:
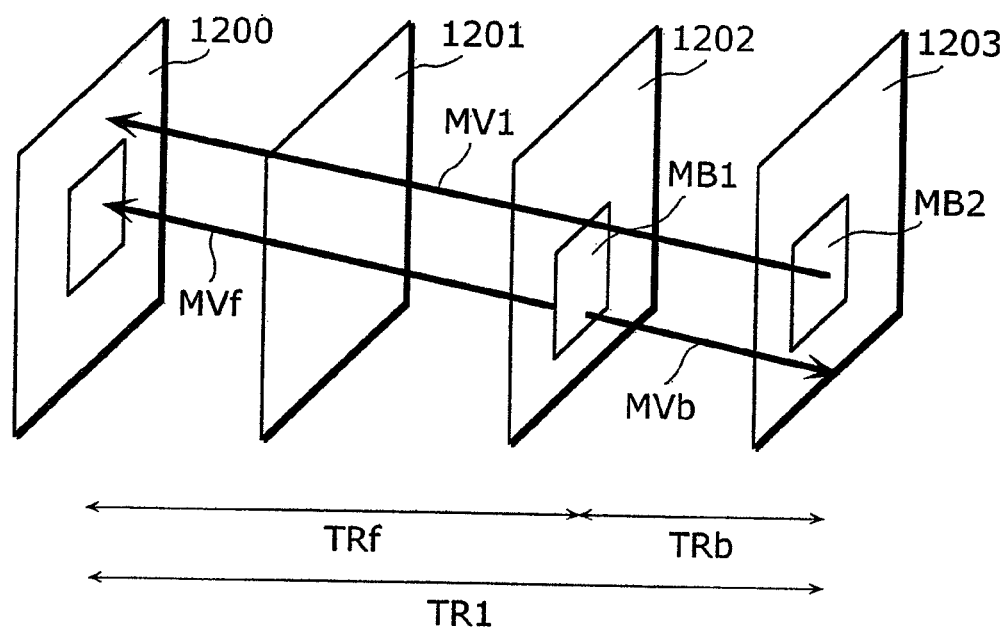
FIG. 1 is an illustration of motion vectors.
Figure 2:
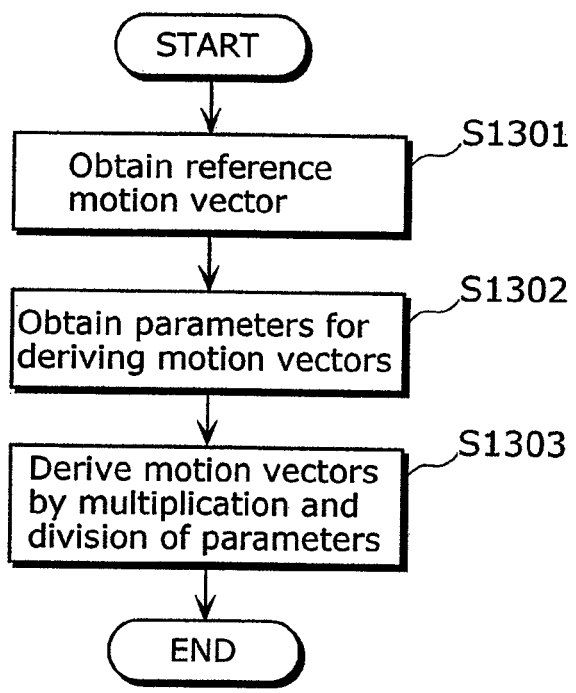
FIG. 2 is a flowchart showing a flow of conventional processing for deriving motion vectors.

This motion vector derivation unit 11B derives motion vectors (MVb and MVf) of a current block to be coded MB1 using the motion vector MVtar (MV1) of the reference block MB2, parameters TRtar (TRf and TRb) and a parameter TR1, as shown in FIG. 1. Here, the motion vector MVtar of the reference block MB2 is scaled using the above Equation 2(a) and Equation 2(b). The parameters TRtar correspond to TRb and TRf as mentioned above.

The comparison unit 52 compares the parameter TR1 for the motion vector MVtar of the reference block MB2 with a predetermined value to determine whether it exceeds the predetermined value or not. Here, a predetermined value means the maximum value "8" of divisors stored in the multiplier parameter table as shown in FIG. 5, for example. The switching unit 55 selects the output of the multiplication unit 54 (Processing 57) or the inputted motion vector MVtar of the reference block MB2 (Processing 58) depending on the comparison result of the comparison unit 52.

The multiplier parameter table (for multipliers) 50 indicates correspondence between parameters TRtar (TRb and TRf) and multipliers (multiplication values). The multiplier parameter table (for divisors) 51 indicates correspondence between TR1 and multipliers (divisors). Note that in the second embodiment, TRtar inputted to the multiplier parameter table 50 is inputted to the multiplication unit 53 as it is, but the present invention is not limited to that, and arithmetic processing may be performed in the multiplier parameter table 50 if necessary.

The multiplication unit 53 multiplies the motion vector MVtar (MV1) of the reference picture 1203 by a multiplier parameter outputted from the multiplier parameter table (for multipliers) 50. The multiplication unit 54 multiplies the output value of the multiplication unit 53 by a multiplier parameter outputted from the multiplier parameter table (for divisors) 51. Note that multiplication in the multiplication units 53 and 54 may be performed in inverse order.

Figure 9:
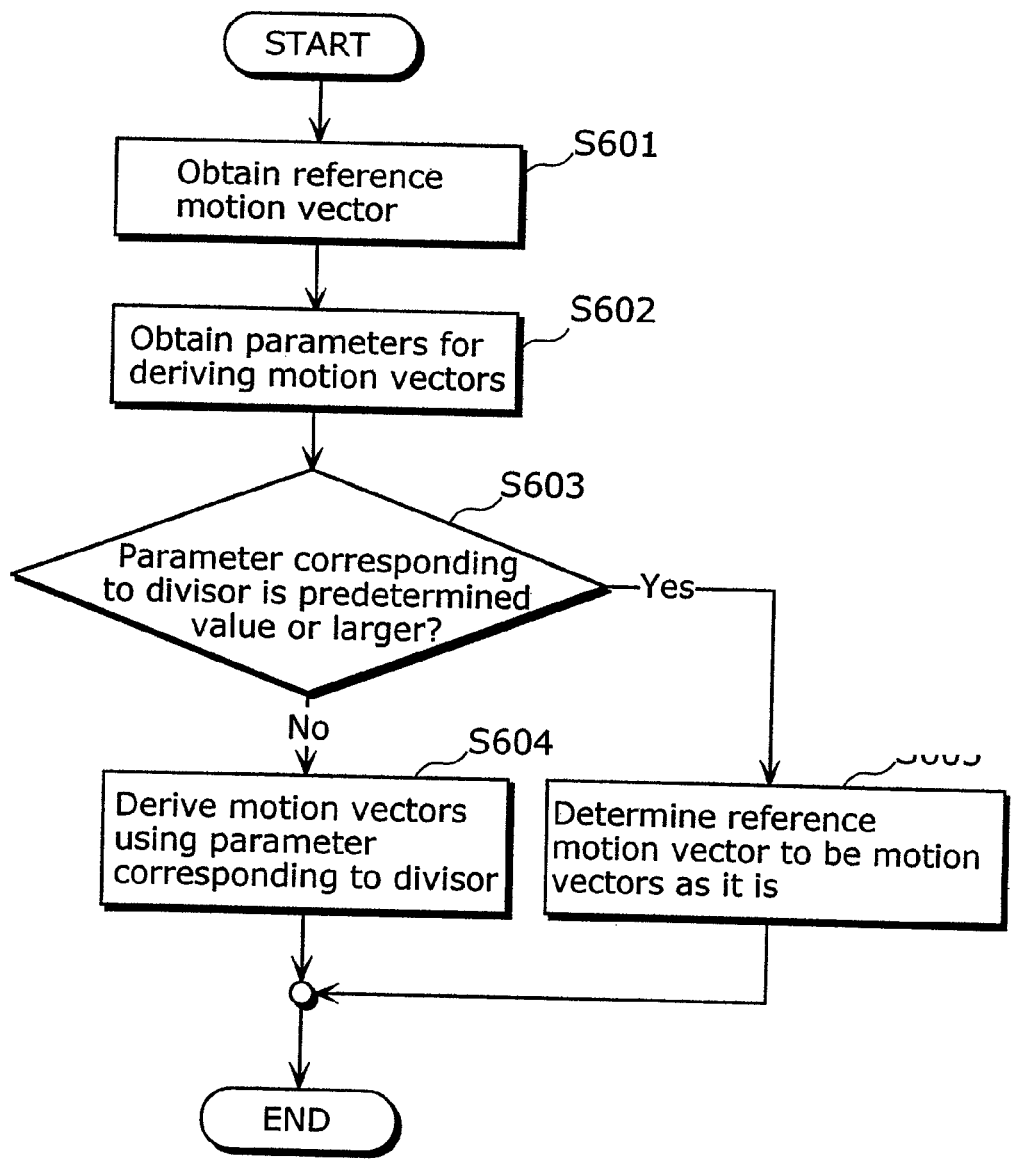
FIG. 9 is a flowchart showing another method for deriving motion vectors of the present invention.

Next, operation of the motion vector derivation unit 11B as shown in FIG. 8 will be explained with reference to FIG. 9. FIG. 9 is a flowchart showing processing procedures of deriving motion vectors MVscl.

First, a motion vector MVtar of a reference block MB2 is obtained (Step S601). Next, parameters (TR1 and TRtar) are obtained for deriving motion vectors MVscl of a current block MB1 (Step S602).

Next, it is judged whether the obtained parameter TR1 corresponding to a divisor is a predetermined value or larger (Step S603). When the parameter TR1 corresponding to the divisor is the predetermined value or larger as a result of the judgment, the switching unit 55 selects the processing 58. On the other hand, when the parameter TR1 is not the predetermined value or larger, the switching unit 55 selects the processing 57.

When the switching unit 55 selects the processing 58, the reference motion vector MVtar obtained in Step S601 is determined to be the motion vectors MVscl as it is (Step S605). On the other hand, when the switching unit 55 selects the processing 57, the motion vectors MVscl are derived using the parameter corresponding to the divisor (TR1) (Step S604). In other words, the results of the multiplications by the multiplication units 53 and 54 are the motion vectors MVscl.

Since the current picture 1202 as shown in FIG. 1 has a forward motion vector MVs and a backward motion vector MVb, the processing as shown in FIG. 9 is performed for deriving these two motion vectors, respectively. To be more specific, when calculating a motion vector MVf as a motion vector MVscl, a parameter TRtar obtained in Step S602 is a parameter TRf, and when calculating a motion vector MVb as a motion vector MVscl, a parameter TRtar obtained in Step S602 is a parameter TRb.

As described above, in the second embodiment, the processing procedure is predetermined: (1) a parameter used for scaling a motion vector of a reference block is limited to a predetermined range of values, and (2) when the parameter exceeds the upper limit, the inputted MVtar is used as a motion vector MVscl as it is without scaling the motion vector MVtar, and thus inconsistency in the results due to calculation error between coding and decoding can be prevented. Processing amount for deriving motion vectors can also be reduced. In addition, data amount of a multiplier parameter table stored in a memory can be reduced.

As described in the background art, the parameters TR1 and TRtar are not limited to data indicating a difference in time information between pictures, but may be quantitative data indicating a temporal distance between pictures in display order so as to be used for scaling motion vectors, such as data obtained using a difference in picture numbers assigned to respective pictures (for example, in FIG. 1, when the picture numbers of the pictures 1200 and 1203 are respectively 1200 and 1203, the data is "3" obtained by subtracting 1200 from 1203) and data obtained using the number of pictures between pictures (for example, in FIG. 1, although there are two pictures between the picture 1200 and the picture 1203, the distance between these pictures is determined to be 2+1="3" as TR1).

Figure 12:
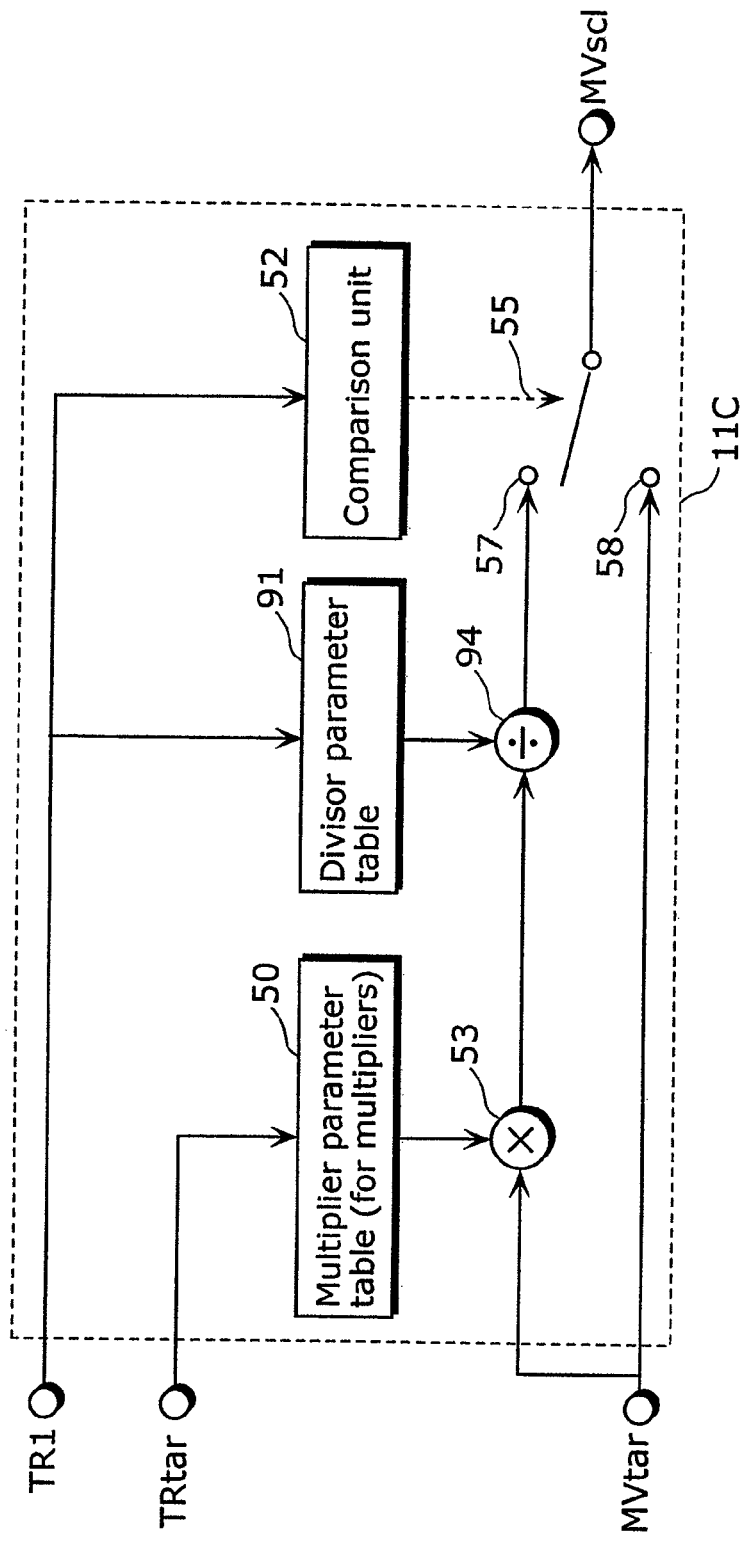
FIG. 12 is a block diagram showing a structure of still another motion vector derivation unit of the present invention.

Also, in the second embodiment, a case has been explained where the parameter TR1 is compared with the upper limit of divisors stored in the multiplier parameter table, and when TR1 does not exceed the upper limit, the multiplication unit 54 performs multiplication using the multiplier parameter table 51, but the division unit 94 may perform division using a divisor parameter table 91 as shown in FIG. 12. A motion vector derivation unit 11C as shown in FIG. 12 corresponds to the motion vector derivation unit 11 in the block diagram of the moving picture coding apparatus as shown in FIG. 3. Note that the structure of the moving picture coding apparatus as shown in the block diagram of FIG. 3, except the motion vector derivation unit 11, has already been explained in the first embodiment. In FIG. 12, the same numbers are assigned to the same units as those in FIG. 8.

Figure 10:
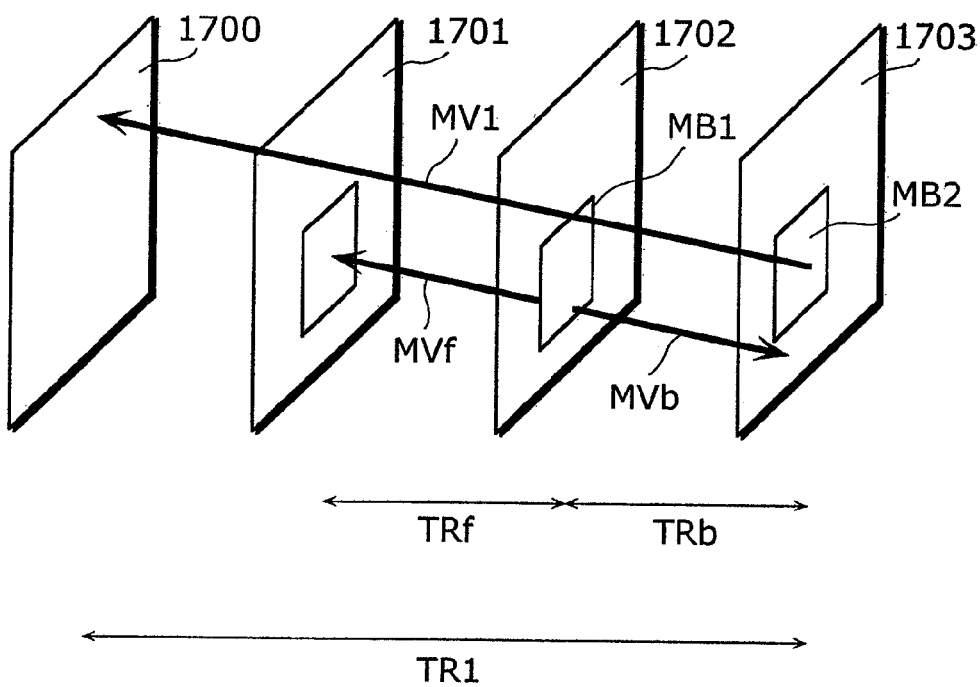
FIG. 10 is an illustration of other motion vectors of the present invention.
Figure 11:
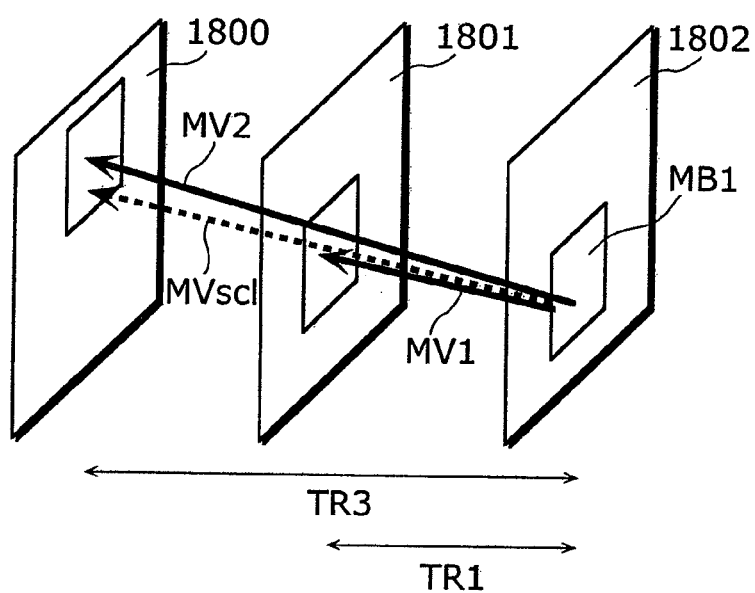
FIG. 11 is an illustration of still other motion vectors of the present invention.

In the first and second embodiments, a case has been explained where motion vectors as shown in FIG. 1 are derived using Equation 2(a) and Equation 2(b), but even when deriving motion vectors as shown in FIG. 10 or FIG. 11, the invention described in the present specifications can be used.

First, a method for deriving motion vectors in direct mode as shown in FIG. 10 will be explained. In FIG. 10, a picture 1700, a picture 1701, a picture 1702 and a picture 1703 are located in display order, and a block MB1 is a current block to be coded. FIG. 10 shows an example of bi-prediction from the current block MB1 with reference to the picture 1700 and the picture 1703.

Motion vectors MVf and MVb of the current block MB1 can be derived using a motion vector MV1 of a reference block MB2 which is located temporally backward of the current block MB1 in display order by the above Equation 2(a) and Equation 2(b).

Here, MVf is a forward motion vector of the current block MB1, MVb is a backward motion vector of the current block MB1, Tscl is a multiplier parameter corresponding to an inverse value of a distance between the picture 1700 and the picture 1703, that is, 1/TR1, TRf is a distance between the picture 1701 and the picture 1702, and TRb is a distance between the picture 1702 and the picture 1703.

Note that as for TR1, TRf and TRb, any data may be used if a distance between pictures can be determined quantitatively using the data, as explained above. Also, a flow of the processing for deriving a motion vector MVf and a motion vector MVb is same as that described in FIG. 6 or FIG. 9.

Next, a method for deriving motion vectors as shown in FIG. 11 will be explained. In FIG. 11, a picture 1800, a picture 1801, a picture 1802 are located in display order, and a block MB1 is a current block to be coded. In FIG. 11, the current block MB1 is predicted with reference to the picture 1800 and the picture 1801, and has motion vectors MV1 and MV2. The motion vector MV2 is predicatively coded using a motion vector MVscl that is a scaled version of the motion vector MV1 explained as follows.

First, the motion vector MVscl, that is, a vector pointing to the reference picture 1800 pointed by the motion vector MV2 from the current block MB1, is derived by the following equations. It is assumed that the motion vector MV2 which is to be coded has been derived by a predetermined method. Equation 3(a) and Equation 3(b) can be applied to the case described in the first embodiment, and Equation 4(a) and Equation 4(b) can be applied to the case described in the second embodiment.

$$MVscl = MV1 \times TR3 \times Tscl \quad (TR1 < \text{upper limit})$$ Equation 3(a)

$$MVscl = MV1 \times TR3 \times TsclMin \quad (TR1 \geq \text{upper limit})$$ Equation 3(b)

$$MVscl = MV1 \times TR3 \times Tscl \quad (TR1 < \text{upper limit})$$ Equation 4(a)

$$MVscl = MV1 \quad (TR1 \geq \text{upper limit})$$ Equation 4(b)

Here, Tscl is an inverse value of TR1 where TR1 is a distance between the picture 1801 and the picture 1802, the upper limit is the maximum divisor ("8" in FIG. 5) in the multiplier parameter table 51 (for divisors), TsclMin is a multiplier parameter corresponding to the maximum divisor (TR1) in the multiplier parameter table 51 (for divisors), TR3 is a distance between the picture 1800 and the picture 1802, and TR1 is a distance between the picture 1801 and the picture 1802.

Next, for coding the motion vector MV2, the motion vector MV2 itself is not coded, but only a difference (differential vector) between the motion vector MVscl derived using any of Equations 3(a), 3(b), 4(a) and 4(b) and the motion vector MV2 derived by the predetermined method is coded, and thus, in decoding processing, the motion vector MV2 is derived using the coded differential vector and MVscl that is a scaled version of the motion vector MV1.

As for TR1 and TR3, any data can be used if a temporal distance between pictures in display order can be determined quantitatively using the data, as explained above. The flow of the processing of deriving a motion vector MVscl is same as that described in FIG. 6 or FIG. 9. Also, the upper limit in the multiplier parameter table as shown in FIG. 5 is "8", but the value is not limited to that, and it may be other values such as "16" and "32". However, since a change in a multiplicative inverse corresponding to a divisor becomes smaller as the divisor becomes larger, an error of a derived motion vector is considerably small even if it is derived using a multiplier parameter with its upper limit set to be larger.

Third Embodiment

Figure 13:
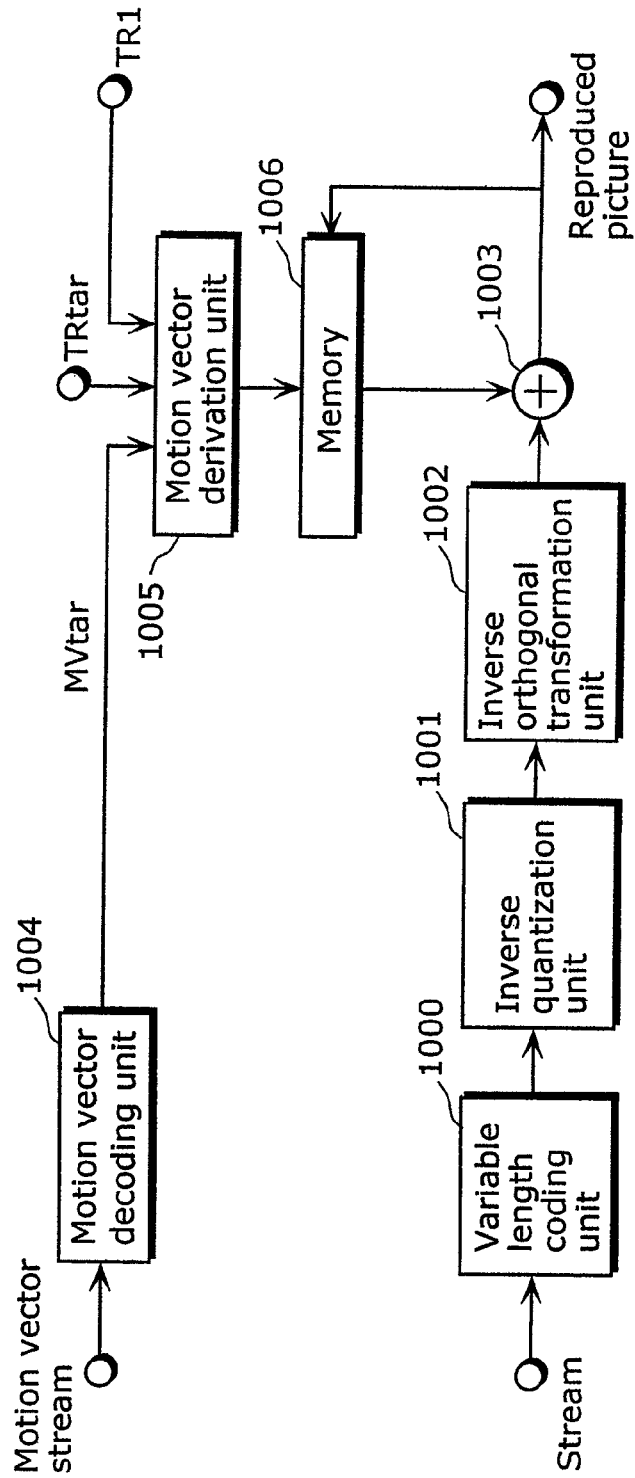
FIG. 13 is a block diagram showing a structure of a moving picture decoding apparatus of the present invention.

FIG. 13 is a block diagram showing a structure of a moving picture decoding apparatus according to the third embodiment.

As shown in FIG. 13, the moving picture decoding apparatus includes a variable length decoding unit 1000, an inverse quantization unit 1001, an inverse orthogonal transformation unit 1002, an addition unit 1003, a motion vector decoding unit 1004, a motion vector derivation unit 1005 and a memory 1006. Note that the specific explanation of the structure and operation of the motion vector derivation unit 1005 will be omitted because they are same as those of the first and second embodiments.

The variable length decoding unit 1000 performs variable length decoding for the coded data stream outputted from the moving picture coding apparatus according to each of the above embodiments, and outputs coded prediction error data to the inverse quantization unit 100, and outputs at the same time motion vector derivation parameters TRtar and TR1 to the motion vector derivation unit 1005. The inverse quantization unit 1001 inverse quantizes the inputted coded prediction error data. The inverse orthogonal transformation unit 1002 performs inverse orthogonal transformation for the inverse-quantized coded prediction error data to output differential image data.

The motion vector decoding unit 1004 decodes the inputted motion vector stream to extract motion vector information. The motion vector derivation unit 1005 derives motion vectors MVscl (MVb and MVf) of a current block to be coded MB1 using a motion vector MVtar of a reference block MB2, parameters TRtar and a parameter TR1. The memory 1006 stores the image data of the reference pictures and the motion vectors MVscl of the current block MB1 derived by the motion vector derivation unit 1005. The memory 1006 also generates motion compensation data based on the image data of the reference picture and the motion vectors MVscl of the current block MB1. The addition unit 1003 adds the inputted differential image data and the motion compensation data for generating and outputting decoded images.

Next, operation of direct mode decoding in the moving picture decoding apparatus structured as mentioned above will be explained.

The coded data stream outputted from the moving picture coding apparatus is inputted to the variable length decoding unit 1000. The variable length decoding unit 1000 performs variable length decoding for the coded data stream, and outputs coded differential data to the inverse quantization unit 1001, and outputs at the same time parameters TRtar and TR1 to the motion vector derivation unit 1005. The coded differential data inputted to the inverse quantization unit 1001 is inverse quantized, inverse orthogonal transformed, and then outputted to the addition unit 1003 as differential image data.

Also, the motion vector stream inputted to the moving picture decoding apparatus according to the present embodiment is inputted to the motion vector decoding unit 1004 to extract motion vector information. To be more specific, the motion vector decoding unit 1004 decodes the motion vector stream and outputs the motion vector MVtar to the motion vector derivation unit 1005. Next, the motion vector derivation unit 1005 derives motion vectors MVscl (MVb and MVf) of a current block to be coded using the motion vector MVtar and the parameters TRtar and TR1. The memory 1006 extracts, from among the image data of the reference pictures stored therein, images which are indicated by the motion vectors derived by the motion vector derivation unit 1005, and outputs them as motion compensation data. The addition unit 1003 adds the inputted differential image data and the motion compensation data to generate decoded image data, and outputs it as a reproduced picture in the end.

Fourth Embodiment

In addition, if a program, for realizing the structure of the moving picture coding method and the moving picture decoding method as shown in each of the embodiments, is recorded on a storage medium such as a flexible disk, it becomes possible to perform the processing as shown in these embodiments easily in an independent computer system.

Figure 14A:
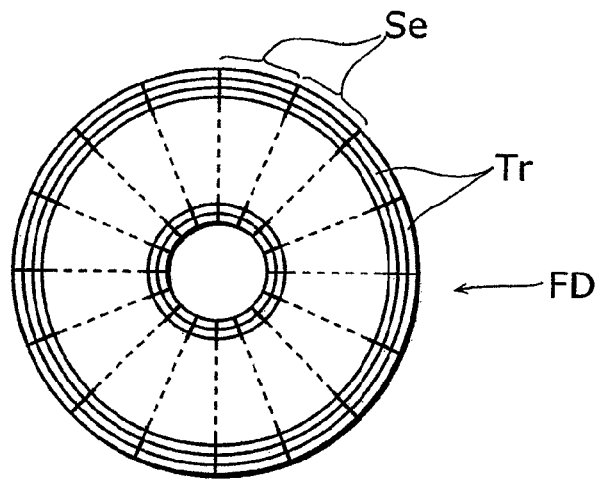
FIGS. 14A-14C are illustrations of a recording medium storing a program for realizing the moving picture coding method and the moving picture decoding method in each of the present embodiments in a computer system, and specifically.
Figure 14B:
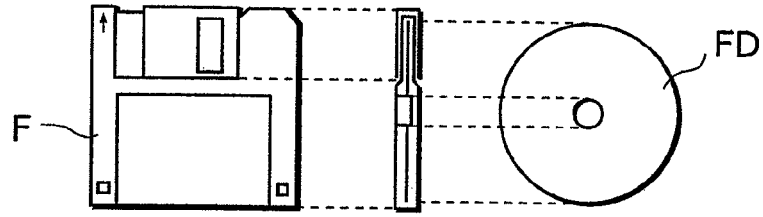
Figure 14C:
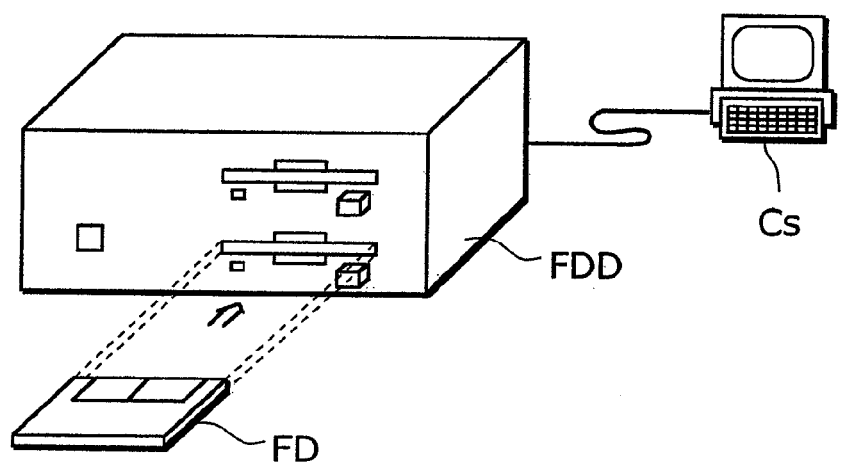

FIGS. 14A, 14B and 14C are illustrations of a storage medium for storing a program for realizing the moving picture coding method and the moving picture decoding method in the first, second and third embodiments in a computer system.

FIG. 14B shows a flexible disk and the front view and the cross-sectional view of the appearance of the flexible disk, and FIG. 14A shows an example of a physical format of a flexible disk as a storage medium itself. A flexible disk FD is contained in a case F, a plurality of tracks Tr are formed concentrically on the surface of the disk in the radius direction from the periphery, and each track is divided into 16 sectors Se in the angular direction. Therefore, as for the flexible disk storing the above-mentioned program, the moving picture coding method as the program is recorded in an area allocated for it on the flexible disk FD.

FIG. 14C shows the structure for writing and reading the program on and from the flexible disk FD. When the program is recorded on the flexible disk FD, the computer system Cs writes the moving picture coding method or the moving picture decoding method as the program on the flexible disk FD via a flexible disk drive. For constructing the moving picture coding method in the computer system by the program recorded on the flexible disk, the program is read out from the flexible disk via the flexible disk drive and transferred to the computer system.

The above explanation is made on the assumption that a storage medium is a flexible disk, but the same processing can also be performed using an optical disk. In addition, the storage medium is not limited to a flexible disk and an optical disk, but any other mediums such as an IC card and a ROM cassette can be used if a program can be recorded on them.

Here, the applications of the moving picture coding method and the moving picture decoding method as shown in the above embodiments and the system using them will be explained below.

FIG. 15 is a block diagram showing the overall configuration of a content providing system ex100 for realizing content distribution service. The area for providing communication service is divided into cells of desired size, and base stations ex107~ex110 which are fixed wireless stations are placed in respective cells.

In this content providing system ex100, apparatuses such as a computer ex111, a PDA (Personal Digital Assistant) ex112, a camera ex113, a mobile phone ex114 and a camera-equipped mobile phone ex115 are connected to each other via the Internet ex101, an Internet service provider ex102, a telephone network ex104 and base stations ex107~ex110.

However, the content providing system ex100 is not limited to the configuration as shown in FIG. 15, and any of these apparatuses may be connected as a combination. Also, each apparatus may be connected directly to the telephone network ex104, not through the base stations ex107~ex110.

The camera ex113 is an apparatus such as a digital video camera capable of shooting moving pictures. The mobile phone may be a mobile phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handy-phone System) or the like.

A streaming server ex103 is connected to the camera ex113 via the telephone network ex104 and the base station ex109, which enables live distribution or the like using the camera ex113 based on the coded data transmitted from the user. Either the camera ex113 or the server for transmitting the data may code the data shot by the camera. Also, the moving picture data shot by a camera ex116 may be transmitted to the streaming server ex103 via the computer ex111. The camera ex116 is an apparatus such as a digital camera capable of shooting still and moving pictures. Either the camera ex116 or the computer ex111 may code the moving picture data. An LSI ex117 included in the computer ex111 or the camera ex116 actually performs coding processing. Software for coding and decoding moving pictures may be integrated into any type of a storage medium (such as a CD-ROM, a flexible disk and a hard disk) which is readable by the computer ex111 or the like. Furthermore, the camera-equipped mobile phone ex115 may transmit the moving picture data. This moving picture data is the data coded by the LSI included in the mobile phone ex115.

In the content providing system ex100, contents (such as a music live video) shot by users using the camera ex113, the camera ex116 or the like are coded in the same manner as the above embodiments and transmitted to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. In the content providing system ex100, the clients can thus receive and reproduce the coded data, and further can receive, decode and reproduce the data in real time so as to realize personal broadcasting.

When each apparatus in this system performs coding or decoding, the moving picture coding apparatus or the moving picture decoding apparatus, as shown in the above embodiments, can be used.

A mobile phone will be explained as an example.

Figure 16:
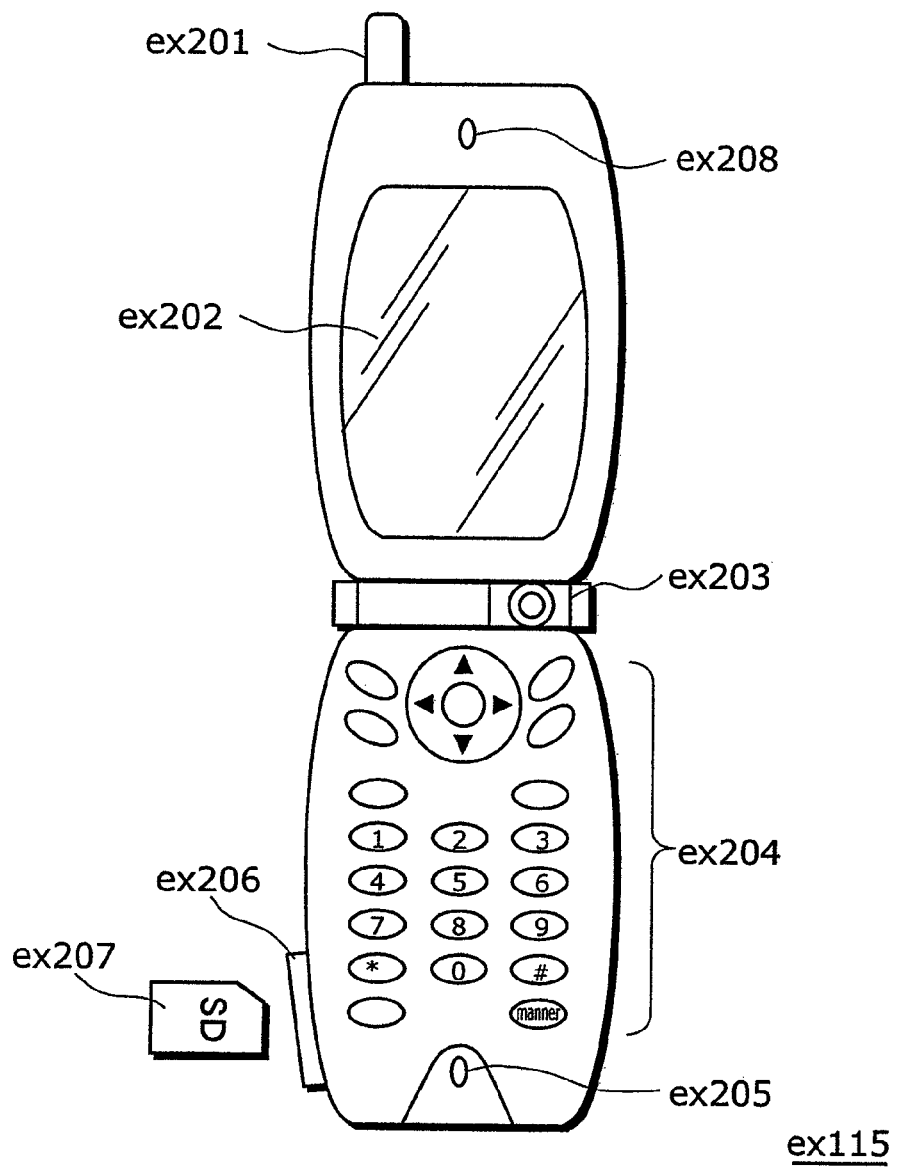
FIG. 16 is a schematic diagram showing a mobile phone as an example.

FIG. 16 is a diagram showing the mobile phone ex115 realized using the moving picture coding method and the moving picture decoding method explained in the above embodiments. The mobile phone ex115 has an antenna ex201 for sending and receiving radio waves between the base station ex110, a camera unit ex203 such as a CCD camera capable of shooting moving and still pictures, a display unit ex202 such as a liquid crystal display for displaying the data obtained by decoding video and the like shot by the camera unit ex203 or received by the antenna ex201, a main body including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera and data of moving or still pictures of received e-mails, and a slot unit ex206 for attaching the storage medium ex207 into the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

Next, the mobile phone ex115 will be explained with reference to FIG. 17. In the mobile phone ex115, a main control unit ex311 for overall controlling each unit of the main body including the display unit ex202 and the operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a read/write unit ex307, a modem circuit unit ex306 and a voice processing unit ex305 to each other via a synchronous bus ex313.

When a call-end key or a power key is turned ON by a user's operation, the power supply circuit unit ex310 supplies respective units with power from a battery pack so as to activate the camera-equipped digital mobile phone ex115 for a ready state.

In the mobile phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the send/receive circuit unit ex301 performs digital-to-analog conversion and frequency conversion of the data, so as to transmit the resulting data via the antenna ex201. Also, in the mobile phone ex115, the send/receive circuit unit ex301 amplifies the data received by the antenna ex201 in conversation mode and performs frequency conversion and analog-to-digital conversion of the data, the modem circuit unit ex306 performs inverse spread spectrum processing of the data, and the voice processing unit ex305 converts it into analog voice data, so as to output the resulting data via the voice output unit ex208.

Furthermore, when transmitting an e-mail in data communication mode, the text data of the e-mail inputted by operating the operation keys ex204 on the main body is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency conversion of it, the resulting data is transmitted to the base station ex110 via the antenna ex201.

When picture data is transmitted in data communication mode, the picture data shot by the camera unit ex203 is supplied to the picture coding unit ex312 via the camera interface unit ex303. When it is not transmitted, the picture data shot by the camera unit ex203 can also be displayed directly on the display unit 202 via the camera interface unit ex303 and the LCD control unit ex302.

The picture coding unit ex312, which includes the moving picture coding apparatus as explained in the present invention, codes the picture data supplied from the camera unit ex203 by the coding method used for the moving picture coding apparatus as shown in the above embodiments so as to transform it into coded picture data, and sends it out to the multiplex/demultiplex unit ex308. At this time, the mobile phone ex115 sends out the voices received by the voice input unit ex205 during shooting pictures by the camera unit ex203 to the multiplex/demultiplex unit ex308 as digital voice data via the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the resulting multiplexed data, and the send/receive circuit unit ex301 performs digital-to-analog conversion and frequency conversion of the data for transmitting via the antenna ex201.

As for receiving data of a moving picture file which is linked to a Website or the like in data communication mode, the modem circuit unit ex306 performs inverse spread spectrum processing of the data received from the base station ex110 via the antenna ex201, and sends out the resulting multiplexed data to the multiplex/demultiplex unit ex308.

In order to decode the multiplexed data received via the antenna ex201, the multiplex/demultiplex unit ex308 demultiplexes the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the moving picture decoding apparatus as explained in the present invention, decodes the bit stream of picture data by the decoding method paired with the coding method as shown in the above-mentioned embodiments, so as to generate reproduced moving picture data, and supplies this data to the display unit ex202 via the LCD control unit ex302, and thus moving picture data included in a moving picture file linked to a Website, for instance, is displayed. At the same time, the voice processing unit ex305 converts the voice data into analog voice data, and supplies this data to the voice output unit ex208, and thus voice data included in a moving picture file linked to a Website, for instance, is reproduced.

Figure 18:
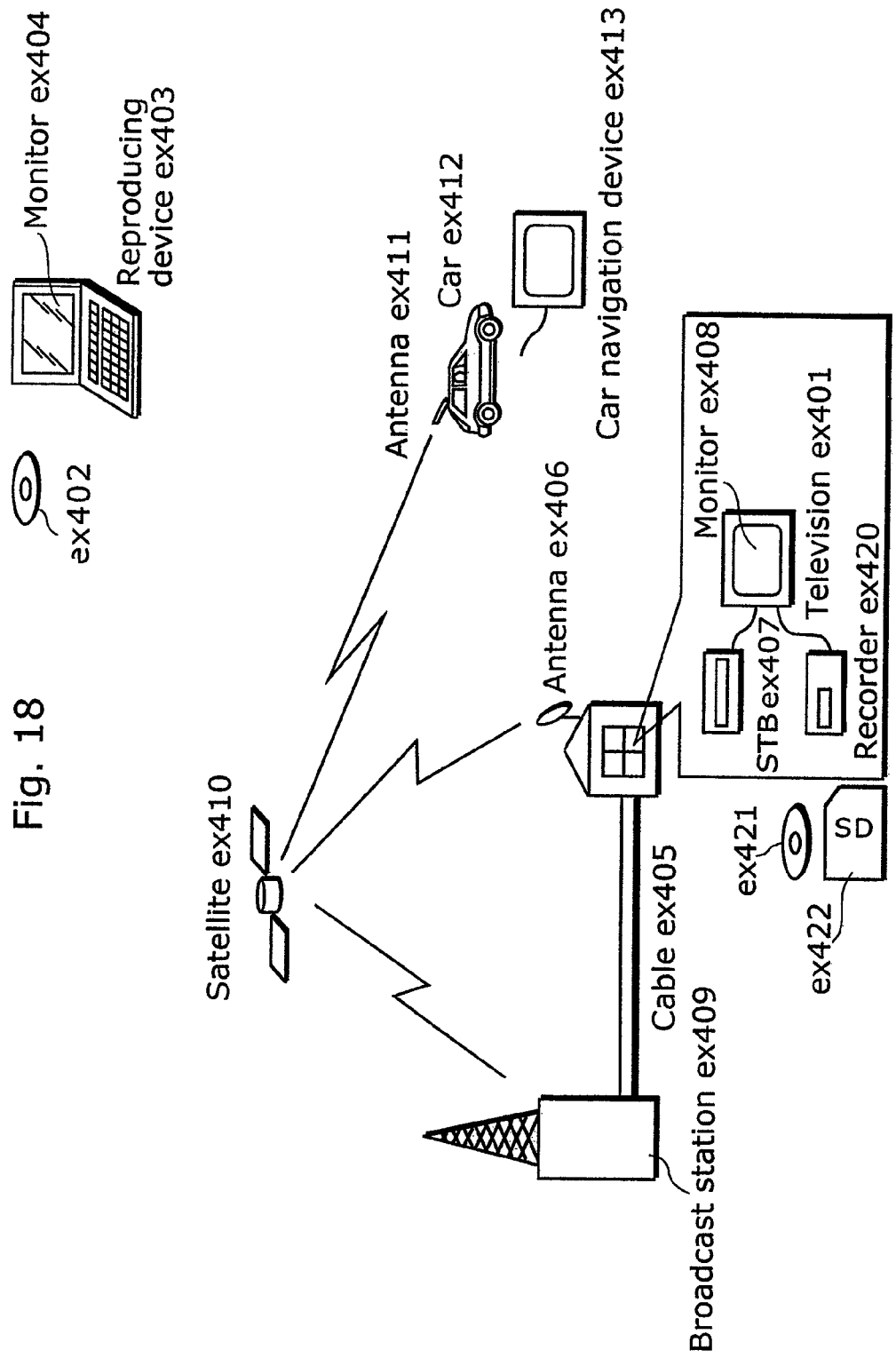
FIG. 18 is a diagram showing a digital broadcast system as an example.

The present invention is not limited to the above-mentioned system, and at least either the moving picture coding apparatus or the moving picture decoding apparatus in the above-mentioned embodiments can be incorporated into a digital broadcasting system as shown in FIG. 18. Such ground-based or satellite digital broadcasting has been in the news lately. More specifically, a bit stream of video information is transmitted from a broadcast station ex409 to or communicated with a broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 and a set top box (STB) ex407 decodes the bit stream for reproduction. The moving picture decoding apparatus as shown in the above-mentioned embodiments can be implemented in the reproducing device ex403 for reading the bit stream recorded on a storage medium ex402 such as a CD and DVD and decoding it. In this case, the reproduced video signals are displayed on a monitor ex404. It is also conceived to implement the moving picture decoding apparatus in the set top box ex407 connected to a cable ex405 for a cable television or the antenna ex406 for satellite and/or ground-based broadcasting so as to reproduce the video signals on a monitor ex408 of the television ex401. The moving picture decoding apparatus may be incorporated into the television, not in the set top box. Or, a car ex412 having an antenna ex411 can receive signals from the satellite ex410 or the base station ex107 for reproducing moving pictures on a display apparatus such as a car navigation device ex413 in the car ex412.

Furthermore, the moving picture coding apparatus as shown in the above-mentioned embodiments can encode picture signals for recording on a storage medium. As a concrete example, there is a recorder ex420 such as a DVD recorder for recording picture signals on a DVD disk ex421 and a disk recorder for recording them on a hard disk. They can also be recorded on an SD card (memory card) ex422. If the recorder ex420 includes the moving picture decoding apparatus as shown in the above-mentioned embodiments, the picture signals recorded on the DVD disk ex421 or the SD card ex422 can be reproduced for display on the monitor ex408.

Figure 17:
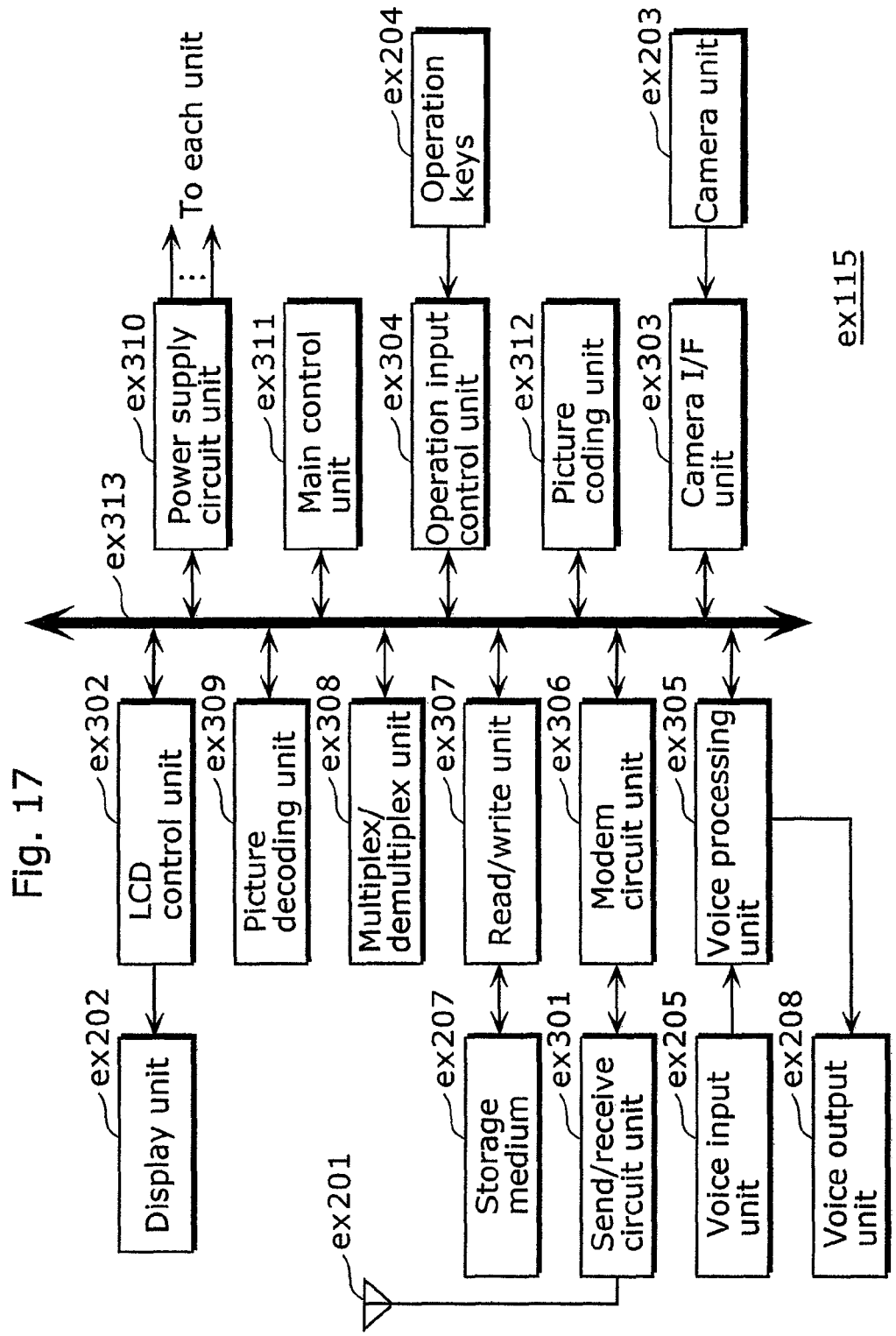
FIG. 17 is a block diagram showing the structure of the mobile phone.

As the structure of the car navigation device ex413, the structure without the camera unit ex203, the camera interface unit ex303 and the picture coding unit ex312, out of the units as shown in FIG. 17, is conceivable. The same applies to the computer ex111, the television (receiver) ex401 and others.

In addition, three types of implementations can be conceived for a terminal such as the above-mentioned mobile phone ex114; a sending/receiving terminal equipped with both an encoder and a decoder, a sending terminal equipped with an encoder only, and a receiving terminal equipped with a decoder only.

As described above, it is possible to apply the moving picture coding method or the moving picture decoding method in the above-mentioned embodiments to any of the above apparatuses and systems, and by applying this method, the effects described in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

As obvious from the above explanation, according to the motion vector derivation method of the present invention, multiplication can be performed instead of division for scaling a reference motion vector, and thus motion vectors can be derived with a smaller amount of calculation. Also, parameters used for scaling the reference motion vector are limited to a predetermined range of values, and thus data amount of a multiplier parameter table stored in a memory can be reduced. As a result, since processing load for deriving motion vectors is reduced, even a device with low capability can perform the processing, and thus the practical value of the present invention is high.

INDUSTRIAL APPLICABILITY

As described above, the motion vector derivation method, the moving picture coding method and the moving picture decoding method according to the present invention are useful as methods for coding each picture constituting an inputted moving picture to output the result as coded moving picture data and for decoding this coded moving picture data, using a mobile phone, a DVD apparatus and a personal computer, for example.

The invention claimed is:

1. An image coding method for coding a current block in a current picture, the method comprising:
   obtaining a reference motion vector of a reference block, the reference motion vector being used for deriving a motion vector of the current block to be coded;
   calculating a first parameter corresponding to a difference between a display order of a picture including a reference block and a display order of a reference picture of the reference block, wherein said reference block is motion-compensated using the reference motion vector, and said reference picture is referred to by the reference motion vector;
   calculating a second parameter corresponding to a difference between a display order of a current picture and a display order of the reference picture, wherein said current picture includes the current block;
   judging if (i) the reference motion vector of the reference block refers to a picture having a display order located after a display order of a picture including the reference block and (ii) the first parameter is a negative value within a predetermined range;
   deriving the motion vector of the current block by scaling the reference motion vector based on a predetermined negative value and the second parameter, when the first parameter is a negative value out of the predetermined range as a result of said judging, and by scaling the reference motion vector based on the first parameter and the second parameter, when the first parameter is a negative value within the predetermined range as a result of said judging;
   generating a motion compensated image of the current block using the derived motion vector and a reference picture corresponding to the derived motion vector; and
   coding a difference image between the current block and the motion compensated image of the current block.

2. An image coding apparatus which codes a current block in a current picture, the apparatus comprising:
   a unit operable to obtain a reference motion vector of a reference block, the reference motion vector being used for deriving a motion vector of the current block to be coded;
   a unit operable to calculate a first parameter corresponding to a difference between a display order of a picture including a reference block and a display order of a reference picture of the reference block, wherein said reference block is motion-compensated using the reference motion vector, and said reference picture is referred to by the reference motion vector;

a unit operable to calculate a second parameter corresponding to a difference between a display order of a current picture and a display order of the reference picture, wherein said current picture includes the current block;

a judging unit operable to judge if (i) the reference motion vector of the reference block refers to a picture having a display order located after a display order of a picture including the reference block and (ii) the first parameter is a negative value within a predetermined range;

a motion vector derivation unit operable to derive the motion vector of the current block by scaling the reference motion vector based on a predetermined negative value and the second parameter, when it is judged by said judging unit that the first parameter is a negative value out of the predetermined range, and by scaling the reference motion vector based on the first parameter and the second parameter, when it is judged by said judging unit that the first parameter is a negative value within the predetermined range;

a unit operable to generate a motion compensated image of the current block using the derived motion vector and a reference picture corresponding to the derived motion vector; and a unit operable to code a difference image between the current block and the motion compensated image of the current block.

* * * * *